(12) United States Patent
Scott et al.

(10) Patent No.: US 10,202,083 B2
(45) Date of Patent: Feb. 12, 2019

(54) CROSSBAR-TO-VEHICLE COUPLER HAVING ADJUSTABLE TOE ANGLE

(71) Applicant: Yakima Products, Inc., Lake Oswego, OR (US)

(72) Inventors: Todd Wendell Scott, Beaverton, OR (US); Scott A. McFadden, Portland, OR (US); Gian-Marco D'Angelo, Portland, OR (US); John Mark Elliott, Beaverton, OR (US)

(73) Assignee: Yakima Products, Inc., Lake Oswego, OR (US)

( * ) Notice: Subject to any disclaimer, the term of this patent is extended or adjusted under 35 U.S.C. 154(b) by 56 days.

(21) Appl. No.: 15/176,120

(22) Filed: Jun. 7, 2016

(65) Prior Publication Data

US 2016/0362062 A1    Dec. 15, 2016

Related U.S. Application Data

(60) Provisional application No. 62/173,333, filed on Jun. 9, 2015, provisional application No. 62/175,192, filed on Jun. 12, 2015.

(51) Int. Cl.
```
B60R 9/00      (2006.01)
B60R 9/058     (2006.01)
B60R 9/05      (2006.01)
B60R 9/052     (2006.01)
B60R 11/00     (2006.01)
```
(52) U.S. Cl.
CPC ............ *B60R 9/058* (2013.01); *B60R 9/05* (2013.01); *B60R 9/052* (2013.01); *B60R 2011/0059* (2013.01)

(58) Field of Classification Search
CPC ............ B60R 9/05; B60R 9/058; B60R 9/052; B60R 2011/0059
USPC ........................................................ 224/329
See application file for complete search history.

(56) References Cited

U.S. PATENT DOCUMENTS

| | | |
|---|---|---|
| 488,395 A | 12/1892 | Justice |
| 529,827 A | 11/1894 | Fonda |
| 556,789 A | 3/1896 | Walker |
| 576,351 A | 2/1897 | Penfield |

(Continued)

FOREIGN PATENT DOCUMENTS

| | | |
|---|---|---|
| AU | 2003231667 A1 | 2/2004 |
| AU | 2006100386 A4 | 6/2006 |

(Continued)

OTHER PUBLICATIONS

Yakima Car Racks, Wing Bars and Locking RailRiders, 1997 Catalog, p. 9.

(Continued)

*Primary Examiner* — Peter Helvey
(74) *Attorney, Agent, or Firm* — Kolisch Hartwell, P.C.

(57) ABSTRACT

A crossbar-to-vehicle coupler may include an intra-coupler toe adjustment mechanism. The toe adjustment mechanism may include a pair of structural frames connected at a pivot joint. In some examples, the frames may be secured by a securement mechanism and/or limited in rotation by a mechanical stop. In some examples, an outer housing of the coupler may be fixed to only one of the two frames. A detent mechanism may be provided, including the outer housing and one of the two frames.

12 Claims, 13 Drawing Sheets

(56) References Cited

U.S. PATENT DOCUMENTS

| | | |
|---|---|---|
| 586,681 A | 7/1897 | Douglas |
| 607,024 A | 7/1898 | Durfee et al. |
| 614,264 A | 11/1898 | Fletcher |
| 615,264 A | 12/1898 | Du Pont |
| 1,179,823 A | 4/1916 | Greene |
| 1,789,458 A | 1/1931 | Bureau |
| 2,206,328 A | 7/1940 | Martinek |
| 2,248,170 A | 7/1941 | Hansen |
| 2,302,300 A | 11/1942 | Davies |
| 2,317,195 A | 4/1943 | Husted |
| 2,415,286 A | 2/1947 | Hyde |
| 2,431,400 A | 11/1947 | Iverson |
| 2,536,797 A | 1/1951 | Cooke |
| 2,551,218 A | 5/1951 | Menne |
| 2,573,187 A | 10/1951 | Désilets |
| 2,584,283 A | 2/1952 | Oliver et al. |
| 2,613,020 A | 10/1952 | Berry |
| 2,696,231 A | 12/1954 | Pardo |
| 2,723,005 A | 11/1955 | Wink |
| 2,729,499 A | 1/1956 | Eggum |
| 2,816,672 A | 12/1957 | Facchini |
| 2,988,253 A | 6/1961 | Menghi |
| 3,001,679 A | 9/1961 | Canning et al. |
| 3,042,240 A | 7/1962 | Cline |
| 3,064,868 A | 11/1962 | Treydte |
| 3,113,642 A | 12/1963 | Lay |
| 3,116,836 A | 1/1964 | McCauley |
| 3,155,249 A | 11/1964 | Johnson |
| 3,186,569 A | 6/1965 | Roux |
| 3,190,587 A | 6/1965 | Fries |
| 3,221,960 A | 12/1965 | Gleason et al. |
| 3,239,115 A | 3/1966 | Bott et al. |
| 3,240,406 A | 3/1966 | Logan |
| 3,276,085 A | 10/1966 | Spranger |
| 3,300,171 A | 1/1967 | Walls |
| 3,378,182 A | 4/1968 | McMiller |
| RE26,538 E | 3/1969 | Bott |
| RE26,539 E | 3/1969 | Bott |
| 3,430,983 A | 3/1969 | Jones |
| 3,460,694 A | 8/1969 | Simms |
| 3,469,810 A | 9/1969 | Dorris |
| 3,519,180 A | 7/1970 | Bott |
| 3,529,737 A | 9/1970 | Daugherty |
| 3,554,416 A | 1/1971 | Bott |
| 3,581,962 A | 6/1971 | Osborn |
| 3,596,788 A | 8/1971 | Willie |
| 3,606,432 A | 9/1971 | Honatzis |
| 3,615,069 A | 10/1971 | Bott |
| 3,642,157 A | 2/1972 | Williams, Jr. |
| 3,643,973 A | 2/1972 | Bott |
| 3,677,195 A | 7/1972 | Prete, Jr. |
| 3,677,451 A | 7/1972 | Burland |
| 3,737,083 A | 6/1973 | Lund |
| 3,740,034 A | 6/1973 | Scroggins |
| 3,744,689 A | 7/1973 | Kjensmo |
| 3,777,922 A | 12/1973 | Kirchmeyer |
| 3,826,390 A | 7/1974 | Watson |
| 3,828,993 A | 8/1974 | Carter |
| 3,843,001 A | 10/1974 | Willis |
| 3,848,784 A | 11/1974 | Shimano et al. |
| 3,848,785 A | 11/1974 | Bott |
| 3,858,774 A | 1/1975 | Friis |
| 3,861,533 A | 1/1975 | Radek |
| 3,892,455 A | 7/1975 | Sotolongo |
| D238,771 S | 2/1976 | Spokus, Sr. |
| 3,946,917 A | 3/1976 | Crawford et al. |
| 3,951,320 A | 4/1976 | Bott |
| 3,976,213 A | 8/1976 | Ball |
| 3,993,167 A | 11/1976 | Reed |
| 4,015,760 A | 4/1977 | Bott |
| 4,022,362 A | 5/1977 | Revercomb |
| 4,023,761 A | 5/1977 | Molis |
| 4,034,879 A | 7/1977 | Cudmore |
| 4,046,297 A | 9/1977 | Bland |
| 4,050,616 A | 9/1977 | Mosow |
| 4,055,284 A | 10/1977 | Bott |
| 4,058,243 A | 11/1977 | Tappan |
| 4,081,118 A | 3/1978 | Mason |
| 4,085,763 A | 4/1978 | Thomas |
| 4,089,448 A | 5/1978 | Traeger |
| 4,099,658 A | 7/1978 | Bott |
| 4,106,680 A | 8/1978 | Bott |
| 4,114,409 A | 9/1978 | Scire |
| 4,126,228 A | 11/1978 | Bala et al. |
| 4,132,335 A | 1/1979 | Ingram |
| 4,156,497 A | 5/1979 | Bott |
| 4,162,755 A | 7/1979 | Bott |
| 4,165,827 A | 8/1979 | Bott |
| 4,170,322 A | 10/1979 | Bott |
| 4,171,077 A | 10/1979 | Richard, Jr. |
| 4,174,794 A | 11/1979 | Bott |
| 4,175,682 A | 11/1979 | Bott |
| 4,182,471 A | 1/1980 | Bott |
| 4,213,593 A | 7/1980 | Weik |
| 4,213,729 A | 7/1980 | Cowles et al. |
| 4,222,508 A | 9/1980 | Bott |
| 4,239,139 A | 12/1980 | Bott |
| 4,245,764 A | 1/1981 | Kowalski et al. |
| 4,264,025 A | 4/1981 | Ferguson et al. |
| 4,269,339 A | 5/1981 | Bott |
| 4,274,568 A | 6/1981 | Bott |
| 4,274,569 A | 6/1981 | Winter et al. |
| 4,274,570 A | 6/1981 | Bott |
| 4,277,009 A | 7/1981 | Bott |
| 4,295,587 A | 10/1981 | Bott |
| 4,323,182 A | 4/1982 | Bott |
| 4,326,655 A | 4/1982 | Gradek et al. |
| D264,203 S | 5/1982 | Bott |
| 4,342,411 A | 8/1982 | Bott |
| 4,350,380 A | 9/1982 | Williams |
| 4,358,037 A | 11/1982 | Heideman |
| 4,364,500 A | 12/1982 | Bott |
| 4,372,469 A | 2/1983 | Kowalski et al. |
| 4,401,247 A | 8/1983 | Zoor |
| 4,402,442 A | 9/1983 | Martino |
| 4,403,716 A | 9/1983 | Carlson et al. |
| 4,406,386 A | 9/1983 | Rasor et al. |
| 4,427,141 A | 1/1984 | Bott |
| 4,428,517 A | 1/1984 | Bott |
| 4,431,123 A | 2/1984 | Bott |
| 4,432,478 A | 2/1984 | Bott |
| 4,433,804 A | 2/1984 | Bott |
| 4,437,597 A | 3/1984 | Doyle |
| 4,440,333 A | 4/1984 | Bott |
| 4,442,961 A | 4/1984 | Bott |
| 4,448,336 A | 5/1984 | Bott |
| 4,448,337 A | 5/1984 | Cronce |
| 4,449,656 A | 5/1984 | Wouden |
| 4,460,116 A | 7/1984 | Bott |
| 4,469,261 A | 9/1984 | Stapleton et al. |
| 4,473,178 A | 9/1984 | Bott |
| 4,487,348 A | 12/1984 | Mareydt |
| 4,501,385 A | 2/1985 | Bott |
| 4,516,709 A | 5/1985 | Bott |
| 4,524,893 A | 6/1985 | Cole |
| D282,155 S | 1/1986 | Bott |
| 4,586,638 A | 5/1986 | Prescott et al. |
| 4,588,117 A | 5/1986 | Bott |
| 4,589,622 A | 5/1986 | Hutter |
| 4,616,771 A | 10/1986 | Heideman |
| 4,629,104 A | 12/1986 | Jacquet |
| 4,630,990 A | 12/1986 | Whiting |
| 4,639,039 A | 1/1987 | Nichols |
| 4,640,450 A | 2/1987 | Gallion et al. |
| 4,673,119 A | 6/1987 | Bott |
| 4,684,048 A | 8/1987 | Bott |
| 4,684,049 A | 8/1987 | Maby et al. |
| 4,688,706 A | 8/1987 | Thulin |
| 4,700,873 A | 10/1987 | Young |
| 4,702,398 A | 10/1987 | Seager |
| 4,702,401 A | 10/1987 | Graber et al. |
| RE32,583 E | 1/1988 | Bott |
| 4,717,165 A | 1/1988 | Johnson |
| 4,721,239 A | 1/1988 | Gibbs, III et al. |

(56) References Cited

U.S. PATENT DOCUMENTS

| | | |
|---|---|---|
| D294,340 S | 2/1988 | Robson |
| 4,724,692 A | 2/1988 | Turin et al. |
| 4,751,891 A | 6/1988 | Wilson |
| 4,754,905 A | 7/1988 | Bott |
| 4,757,929 A | 7/1988 | Nelson |
| 4,770,329 A | 9/1988 | Kamaya |
| 4,778,092 A | 10/1988 | Grace |
| 4,789,145 A | 12/1988 | Wenrich |
| D300,734 S | 4/1989 | Kruitbosch |
| 4,817,838 A | 4/1989 | Kamaya |
| 4,823,997 A | 4/1989 | Krieger |
| 4,830,249 A | 5/1989 | Mirenda et al. |
| 4,830,250 A | 5/1989 | Newbold et al. |
| 4,838,467 A | 6/1989 | Bott et al. |
| 4,848,112 A | 7/1989 | Graber et al. |
| 4,848,794 A | 7/1989 | Mader et al. |
| 4,875,608 A | 10/1989 | Graber |
| 4,877,168 A | 10/1989 | Bott |
| 4,877,169 A | 10/1989 | Grim |
| 4,887,754 A | 12/1989 | Boyer et al. |
| 4,890,777 A | 1/1990 | Bott |
| 4,892,279 A | 1/1990 | Lafferty et al. |
| 4,895,096 A | 1/1990 | Goodwin et al. |
| 4,899,917 A | 2/1990 | Bott |
| 4,911,348 A | 3/1990 | Rasor et al. |
| 4,917,428 A | 4/1990 | Sola |
| 4,917,429 A | 4/1990 | Giger |
| 4,934,572 A | 6/1990 | Bowman et al. |
| 4,944,439 A | 7/1990 | Bott |
| D310,196 S | 8/1990 | Bott |
| 4,960,356 A | 10/1990 | Wrenn |
| 4,961,524 A | 10/1990 | Hunts |
| 4,964,287 A | 10/1990 | Gaul |
| 4,967,945 A | 11/1990 | Bott |
| 4,972,983 A | 11/1990 | Bott |
| 4,976,123 A | 12/1990 | Ceron et al. |
| 4,993,615 A | 2/1991 | Arvidsson |
| 4,995,538 A | 2/1991 | Marengo |
| 4,997,332 A | 3/1991 | Johnson |
| 5,005,390 A | 4/1991 | Giannini et al. |
| 5,025,932 A | 6/1991 | Jay |
| 5,025,967 A | 6/1991 | Cronce et al. |
| 5,029,740 A | 7/1991 | Cox |
| 5,033,709 A | 7/1991 | Yuen |
| 5,037,019 A | 8/1991 | Sokn |
| 5,038,988 A | 8/1991 | Thulin |
| 5,042,705 A | 8/1991 | Johansson |
| 5,052,605 A | 10/1991 | Johansson |
| 5,056,700 A | 10/1991 | Blackburn et al. |
| 5,065,921 A | 11/1991 | Mobley |
| 5,118,020 A | 6/1992 | Piretti |
| 5,118,125 A | 6/1992 | Plunkett |
| 5,119,654 A | 6/1992 | Ceron et al. |
| 5,123,147 A | 6/1992 | Blair |
| 5,131,669 A | 7/1992 | Kinnamon et al. |
| 5,136,709 A | 8/1992 | Shirakabe et al. |
| 5,137,195 A | 8/1992 | Walter |
| 5,143,267 A | 9/1992 | Cucheran et al. |
| 5,158,425 A | 10/1992 | Bott |
| 5,169,042 A | 12/1992 | Ching |
| 5,169,044 A | 12/1992 | Englander |
| 5,170,920 A | 12/1992 | Corrente et al. |
| 5,201,487 A | 4/1993 | Epplett |
| 5,201,911 A | 4/1993 | Lee |
| 5,203,483 A | 4/1993 | Cucheran |
| 5,205,453 A | 4/1993 | Pudney et al. |
| 5,207,365 A | 5/1993 | Bott |
| 5,215,233 A | 6/1993 | Baldeck |
| 5,217,149 A | 6/1993 | Simonett |
| 5,226,341 A | 7/1993 | Shores |
| 5,226,570 A | 7/1993 | Pedrini |
| 5,226,634 A | 7/1993 | Rudy, Jr. et al. |
| 5,230,449 A | 7/1993 | Collins et al. |
| 5,232,134 A | 8/1993 | Allen |
| 5,232,138 A | 8/1993 | Cucheran |
| 5,236,153 A | 8/1993 | LaConte |
| 5,244,101 A | 9/1993 | Palmer et al. |
| 5,253,913 A | 10/1993 | Metivier |
| 5,257,710 A | 11/1993 | Cropley |
| 5,259,542 A | 11/1993 | Newbold et al. |
| 5,275,319 A | 1/1994 | Ruana |
| 5,275,320 A | 1/1994 | Duemmler |
| 5,282,560 A | 2/1994 | Ozog |
| 5,282,562 A | 2/1994 | Legault |
| 5,284,282 A | 2/1994 | Mottino |
| 5,291,763 A | 3/1994 | Cuisinot |
| 5,294,033 A | 3/1994 | Duemmler |
| 5,314,104 A | 5/1994 | Lee |
| 5,320,264 A | 6/1994 | Weir |
| 5,326,007 A | 7/1994 | Pudney et al. |
| D349,680 S | 8/1994 | Powell |
| D350,527 S | 9/1994 | Parlor, Sr. |
| 5,346,355 A | 9/1994 | Riemer |
| 5,360,150 A | 11/1994 | Praz |
| 5,375,750 A | 12/1994 | Mandarino et al. |
| 5,385,285 A | 1/1995 | Cucheran et al. |
| 5,388,938 A | 2/1995 | Helton |
| 5,397,042 A | 3/1995 | Pedrini |
| 5,400,938 A | 3/1995 | Kolodziej et al. |
| 5,416,957 A | 5/1995 | Renzi, Sr. et al. |
| 5,419,479 A | 5/1995 | Evels et al. |
| 5,433,356 A | 7/1995 | Russell |
| 5,433,550 A | 7/1995 | Huber |
| 5,435,475 A | 7/1995 | Hudson et al. |
| 5,442,840 A | 8/1995 | Ewald |
| 5,443,190 A | 8/1995 | Cucheran et al. |
| 5,445,300 A | 8/1995 | Eipper et al. |
| 5,452,831 A | 9/1995 | Linnhoff |
| 5,456,396 A | 10/1995 | Allen |
| 5,456,512 A | 10/1995 | Gibbs et al. |
| 5,458,268 A | 10/1995 | Hill |
| 5,471,714 A | 12/1995 | Olson |
| 5,474,218 A | 12/1995 | Arsenault, Jr. et al. |
| 5,476,201 A | 12/1995 | Hall et al. |
| 5,492,258 A | 2/1996 | Brunner |
| 5,499,762 A | 3/1996 | Lee |
| D369,140 S | 4/1996 | Sills |
| 5,511,894 A | 4/1996 | Ng |
| 5,516,017 A | 5/1996 | Arvidsson |
| 5,526,971 A | 6/1996 | Despain |
| 5,535,930 A | 7/1996 | Lee |
| 5,549,231 A | 8/1996 | Fletcher et al. |
| D373,988 S | 9/1996 | Johnson |
| 5,553,761 A | 9/1996 | Audoire et al. |
| 5,556,221 A | 9/1996 | Brunner |
| 5,570,825 A | 11/1996 | Cona |
| 5,577,650 A | 11/1996 | Stapleton |
| 5,582,044 A | 12/1996 | Bolich |
| 5,598,959 A | 2/1997 | Lorensen et al. |
| 5,617,617 A | 4/1997 | Gustin |
| 5,624,063 A | 4/1997 | Ireland |
| 5,628,336 A | 5/1997 | Lee |
| 5,647,522 A | 7/1997 | Routh |
| 5,657,913 A | 8/1997 | Cucheran et al. |
| D386,145 S | 11/1997 | Staller |
| 5,692,659 A | 12/1997 | Reeves |
| 5,695,164 A | 12/1997 | Hartmann et al. |
| 5,697,629 A | 12/1997 | Guild |
| 5,701,628 A | 12/1997 | Morad |
| 5,709,521 A | 1/1998 | Glass et al. |
| 5,730,343 A | 3/1998 | Settelmayer |
| 5,738,258 A | 4/1998 | Farrow et al. |
| 5,762,248 A | 6/1998 | Englander et al. |
| 5,769,291 A | 6/1998 | Chasan |
| 5,769,292 A | 6/1998 | Cucheran et al. |
| 5,775,557 A | 7/1998 | Arvidsson |
| 5,779,119 A | 7/1998 | Talbot et al. |
| 5,806,735 A | 9/1998 | Christiansson et al. |
| 5,810,226 A | 9/1998 | Lee |
| 5,820,002 A | 10/1998 | Allen |
| 5,826,765 A | 10/1998 | Rak et al. |
| 5,833,074 A | 11/1998 | Phillips |
| 5,845,828 A | 12/1998 | Settelmayer |
| 5,848,743 A | 12/1998 | Derecktor |

(56) References Cited

U.S. PATENT DOCUMENTS

| | | |
|---|---|---|
| 5,862,966 A | 1/1999 | Mehls |
| 5,868,621 A | 2/1999 | Parsons |
| 5,875,947 A | 3/1999 | Noel et al. |
| 5,924,614 A | 7/1999 | Kuntze et al. |
| 5,944,198 A | 8/1999 | Ihalainen |
| 5,951,231 A | 9/1999 | Allen |
| 5,984,155 A | 11/1999 | Stapleton |
| 5,988,403 A | 11/1999 | Robideau |
| 5,992,645 A | 11/1999 | West |
| 5,992,805 A | 11/1999 | Tanner |
| 5,996,736 A | 12/1999 | Stankiewicz |
| 6,010,048 A | 1/2000 | Settelmayer |
| 6,015,074 A | 1/2000 | Snavely et al. |
| 6,019,266 A | 2/2000 | Johnson |
| 6,050,467 A | 4/2000 | Drouillard et al. |
| 6,053,336 A | 4/2000 | Reeves |
| 6,062,450 A | 5/2000 | Noel et al. |
| 6,102,265 A | 8/2000 | Stapleton |
| 6,105,841 A | 8/2000 | Aftanas |
| 6,112,965 A | 9/2000 | Lundgren |
| 6,131,781 A | 10/2000 | Murray |
| 6,164,507 A | 12/2000 | Dean et al. |
| 6,176,404 B1 | 1/2001 | Fourel |
| 6,182,876 B1 | 2/2001 | Moliner |
| 6,189,868 B1 | 2/2001 | Santelli, Jr. |
| 6,193,252 B1 | 2/2001 | Lin |
| 6,244,483 B1 | 6/2001 | McLemore et al. |
| 6,273,311 B1 | 8/2001 | Pedrini |
| 6,276,747 B1 | 8/2001 | Ogawa et al. |
| 6,279,802 B1 | 8/2001 | Hickman et al. |
| 6,283,310 B1 | 9/2001 | Dean et al. |
| 6,286,738 B1 | 9/2001 | Robins et al. |
| 6,296,162 B1 | 10/2001 | Englander et al. |
| 6,305,589 B1 | 10/2001 | Chimenti et al. |
| 6,357,643 B1 | 3/2002 | Janner et al. |
| 6,385,822 B1 | 5/2002 | Dean et al. |
| D460,401 S | 7/2002 | Andersson |
| 6,419,134 B1 * | 7/2002 | Grimm .................. B60R 9/058 224/309 |
| 6,422,441 B1 | 7/2002 | Settelmayer et al. |
| 6,439,397 B1 | 8/2002 | Reeves |
| 6,460,743 B2 | 10/2002 | Edgerly et al. |
| D467,220 S | 12/2002 | Walstrom et al. |
| 6,488,249 B1 | 12/2002 | Girardi et al. |
| 6,491,192 B2 | 12/2002 | Aki |
| 6,491,195 B1 | 12/2002 | McLemore et al. |
| 6,494,351 B1 | 12/2002 | Dean |
| 6,516,985 B1 | 2/2003 | Lundgren |
| 6,523,730 B2 | 2/2003 | Anderson |
| 6,523,731 B1 | 2/2003 | Pedrini |
| 6,557,931 B1 | 5/2003 | Tremmel et al. |
| 6,561,398 B1 | 5/2003 | Cole et al. |
| 6,568,644 B2 | 5/2003 | Pedersen |
| 6,622,898 B1 | 9/2003 | Wang |
| 6,640,979 B1 | 11/2003 | Mayfield |
| 6,648,300 B2 | 11/2003 | Chamoun |
| 6,662,982 B1 | 12/2003 | Päkkilä |
| 6,681,971 B2 | 1/2004 | Laverack et al. |
| D487,720 S | 3/2004 | Thomas |
| 6,715,653 B2 | 4/2004 | DeCosta |
| 6,722,541 B1 | 4/2004 | Aftanas et al. |
| 6,736,300 B2 | 5/2004 | Deakin |
| 6,736,301 B1 | 5/2004 | Huang |
| 6,761,297 B1 | 7/2004 | Pedrini |
| 6,766,929 B2 | 7/2004 | Karlsson |
| 6,779,696 B2 | 8/2004 | Aftanas et al. |
| 6,793,186 B2 | 9/2004 | Pedersen |
| 6,796,471 B2 | 9/2004 | Aftanas et al. |
| 6,817,500 B2 | 11/2004 | Neaux |
| 6,840,418 B2 | 1/2005 | Robins et al. |
| 6,843,394 B2 | 1/2005 | Aki |
| 6,845,893 B2 | 1/2005 | Nelson |
| 6,845,922 B2 | 1/2005 | Stark |
| 6,857,545 B2 | 2/2005 | McLemore et al. |
| 6,868,998 B2 | 3/2005 | Dean |
| 6,892,912 B1 | 5/2005 | MacNeil |
| 6,892,913 B1 | 5/2005 | Andersson |
| 6,905,053 B2 | 6/2005 | Allen |
| 6,918,521 B2 | 7/2005 | Settelmayer et al. |
| 6,938,782 B2 | 9/2005 | Dean et al. |
| 6,968,986 B1 | 11/2005 | Lloyd et al. |
| 6,972,042 B2 | 12/2005 | Benson |
| 6,976,615 B2 | 12/2005 | Dean |
| 6,997,657 B1 | 2/2006 | Saward |
| 7,000,811 B2 | 2/2006 | Gilstrap et al. |
| 7,004,365 B2 | 2/2006 | Ingram |
| 7,036,698 B2 | 5/2006 | Allen |
| 7,044,347 B1 | 5/2006 | Pedrini |
| 7,051,909 B2 | 5/2006 | Gibson |
| 7,104,430 B2 | 9/2006 | Reeves |
| 7,117,768 B1 | 10/2006 | Stoeppelwerth |
| 7,131,561 B2 | 11/2006 | Humes |
| 7,175,218 B1 | 2/2007 | Keene |
| 7,182,233 B1 | 2/2007 | Graffy et al. |
| 7,201,436 B2 | 4/2007 | Ludwig et al. |
| 7,222,763 B2 | 5/2007 | Pedrini |
| 7,234,617 B2 | 6/2007 | Weaver et al. |
| 7,240,816 B2 | 7/2007 | Tsai |
| D561,680 S | 2/2008 | Foley et al. |
| D562,217 S | 2/2008 | Davis et al. |
| D562,218 S | 2/2008 | Foley et al. |
| 7,328,824 B2 | 2/2008 | Smith et al. |
| D564,438 S | 3/2008 | Moore |
| D566,034 S | 4/2008 | Davis et al. |
| 7,357,283 B2 | 4/2008 | Settelmayer |
| 7,367,481 B2 | 5/2008 | Barbara |
| 7,404,504 B2 | 7/2008 | Settelmayer |
| 7,413,143 B2 | 8/2008 | Frantz et al. |
| 7,416,098 B2 | 8/2008 | Settelmayer et al. |
| 7,427,049 B2 | 9/2008 | Kennedy et al. |
| 7,481,344 B2 | 1/2009 | Näslund et al. |
| 7,641,249 B2 | 1/2010 | Jung |
| 7,648,151 B2 | 1/2010 | Pedrini |
| 7,721,925 B1 | 5/2010 | Graffy et al. |
| 7,726,528 B2 | 6/2010 | Foley |
| 7,757,914 B2 | 7/2010 | Book et al. |
| D622,208 S | 8/2010 | Sautter et al. |
| 7,784,656 B2 | 8/2010 | Morrill et al. |
| D623,117 S | 9/2010 | Farber |
| 7,815,084 B2 | 10/2010 | Allen et al. |
| D633,030 S | 2/2011 | Robertson |
| D635,086 S | 3/2011 | Shen |
| D638,778 S | 5/2011 | Giddens |
| D642,113 S | 7/2011 | Farber |
| 7,975,888 B2 | 7/2011 | Settelmayer |
| 8,020,737 B2 | 9/2011 | Sweeney |
| 8,021,169 B1 | 9/2011 | Smith |
| 8,087,557 B2 | 1/2012 | Larsson et al. |
| 8,104,651 B2 | 1/2012 | Bingham |
| 8,113,398 B2 | 2/2012 | Sautter et al. |
| 8,136,708 B2 | 3/2012 | Sautter et al. |
| 8,136,709 B2 | 3/2012 | Jeli et al. |
| D656,887 S | 4/2012 | Bogoslofski et al. |
| 8,196,789 B2 | 6/2012 | Kraeuter et al. |
| 8,210,407 B2 | 7/2012 | Sautter et al. |
| 8,235,267 B2 | 8/2012 | Sautter et al. |
| 8,245,893 B2 | 8/2012 | Sautter et al. |
| D669,017 S | 10/2012 | Robertson |
| 8,333,311 B2 | 12/2012 | Hubbard |
| 8,393,508 B2 | 3/2013 | Sautter et al. |
| 8,408,853 B2 | 4/2013 | Womack et al. |
| 8,505,793 B2 | 8/2013 | Foley |
| 8,544,707 B2 | 10/2013 | Hubbard |
| 8,668,181 B2 | 3/2014 | Dazet et al. |
| D703,605 S | 4/2014 | Sautter et al. |
| 8,763,870 B2 | 7/2014 | Davis |
| D717,722 S | 11/2014 | Cagampang et al. |
| 8,925,775 B2 | 1/2015 | Sautter et al. |
| 9,102,274 B2 | 8/2015 | Hubbard |
| 9,132,782 B2 | 9/2015 | Hubbard |
| 9,409,527 B2 | 8/2016 | Hubbard |
| 2001/0013528 A1 | 8/2001 | Chimenti et al. |
| 2002/0053581 A1 | 5/2002 | Peschmann et al. |
| 2002/0125282 A1 | 9/2002 | Laverack et al. |

(56) References Cited

U.S. PATENT DOCUMENTS

| | | |
|---|---|---|
| 2003/0071097 A1 | 4/2003 | Dean |
| 2003/0164390 A1 | 9/2003 | Higginbotham, III |
| 2003/0178457 A1 | 9/2003 | Wang |
| 2003/0222112 A1 | 12/2003 | McLemore et al. |
| 2004/0118886 A1 | 6/2004 | Mirshafiee et al. |
| 2004/0211801 A1 | 10/2004 | Barbara |
| 2004/0238582 A1 | 12/2004 | Pedrini |
| 2005/0029320 A1 | 2/2005 | Chimenti et al. |
| 2005/0051585 A1 | 3/2005 | Kamiya et al. |
| 2005/0061842 A1 | 3/2005 | Tsai |
| 2005/0077335 A1 | 4/2005 | Bourne |
| 2005/0145639 A1 | 7/2005 | Viklund et al. |
| 2005/0205626 A1 | 9/2005 | Dean |
| 2005/0284905 A1 | 12/2005 | Naslund et al. |
| 2006/0000859 A1 | 1/2006 | Frischer |
| 2006/0029483 A1 | 2/2006 | Allen et al. |
| 2006/0049324 A1 | 3/2006 | Smith et al. |
| 2006/0060622 A1 | 3/2006 | Prenger |
| 2006/0086766 A1 | 4/2006 | Settelmayer |
| 2006/0208022 A1 | 9/2006 | Karlsson |
| 2006/0249466 A1 | 11/2006 | Wang |
| 2006/0273122 A1 | 12/2006 | Bogoslofski et al. |
| 2006/0273123 A1 | 12/2006 | Settelmayer |
| 2006/0273124 A1 | 12/2006 | Bogoslofski |
| 2006/0289577 A1 | 12/2006 | Malone |
| 2007/0036628 A1 | 2/2007 | Womack et al. |
| 2007/0108243 A1 | 5/2007 | Bingham |
| 2007/0119887 A1 | 5/2007 | Foley |
| 2007/0119888 A1 | 5/2007 | Chuang |
| 2007/0164065 A1 | 7/2007 | Davis |
| 2008/0000940 A1 | 1/2008 | Wang |
| 2008/0029563 A1 | 2/2008 | Malone |
| 2008/0053926 A1 | 3/2008 | Foley |
| 2008/0099522 A1 | 5/2008 | Clausen et al. |
| 2008/0101883 A1 | 5/2008 | Derecktor |
| 2008/0164292 A1 | 7/2008 | Farney |
| 2008/0193265 A1 | 8/2008 | Sautter et al. |
| 2008/0257924 A1 | 10/2008 | Kmita et al. |
| 2009/0014489 A1 | 1/2009 | Settelmayer et al. |
| 2009/0120984 A1 | 5/2009 | Sautter et al. |
| 2009/0159624 A1 | 6/2009 | Johnson et al. |
| 2009/0184189 A1 | 7/2009 | Soderberg et al. |
| 2009/0236382 A1 | 9/2009 | Sautter et al. |
| 2010/0078454 A1 | 4/2010 | Sautter et al. |
| 2010/0237116 A1 | 9/2010 | Hubbard |
| 2010/0282799 A1 | 11/2010 | Hubbard |
| 2010/0308091 A1 | 12/2010 | Hubbard |
| 2011/0132946 A1 | 6/2011 | Sautter et al. |
| 2011/0139838 A1 | 6/2011 | Sautter et al. |
| 2011/0139841 A1 | 6/2011 | Sautter et al. |
| 2011/0139842 A1 | 6/2011 | Sautter et al. |
| 2011/0174853 A1 | 7/2011 | Hubbard |
| 2011/0290836 A1 | 12/2011 | Shen |
| 2013/0020361 A1 | 1/2013 | Sautter et al. |
| 2013/0022440 A1 | 1/2013 | Sautter et al. |
| 2013/0037585 A1 | 2/2013 | Hubbard et al. |
| 2013/0062379 A1 | 3/2013 | Sautter et al. |
| 2013/0062383 A1 | 3/2013 | Jeli |
| 2013/0062385 A1 | 3/2013 | Pedrini |
| 2013/0175308 A1 | 7/2013 | Sautter et al. |
| 2013/0200121 A1 | 8/2013 | Hubbard |
| 2013/0214020 A1 | 8/2013 | Pedrini |
| 2013/0284779 A1 | 10/2013 | Sautter et al. |
| 2014/0028007 A1 | 1/2014 | Pfeiffer et al. |
| 2014/0097220 A1 | 4/2014 | Sautter et al. |
| 2014/0144958 A1 | 5/2014 | Sautter et al. |
| 2014/0144959 A1 | 5/2014 | Sautter et al. |
| 2014/0144960 A1 | 5/2014 | Condon et al. |
| 2014/0158728 A1 | 6/2014 | Sautter et al. |
| 2014/0158729 A1 | 6/2014 | Pedrini |
| 2014/0166709 A1 | 6/2014 | Hubbard |
| 2015/0069102 A1 | 3/2015 | Hubbard |
| 2015/0232038 A1 | 8/2015 | Robertson |
| 2015/0239402 A1 | 8/2015 | Hubbard |

FOREIGN PATENT DOCUMENTS

| | | |
|---|---|---|
| AU | 2008301329 B2 | 8/2012 |
| AU | 348922 | 5/2013 |
| AU | 2008304016 B2 | 1/2014 |
| CA | 971140 A | 7/1975 |
| CN | 87104266 A | 3/1988 |
| CN | 2445963 Y | 9/2001 |
| CN | 101559737 A | 10/2009 |
| CN | 101559738 A | 10/2009 |
| CN | 101868375 A | 10/2010 |
| CN | 201677818 U | 12/2010 |
| CN | 102177047 A | 9/2011 |
| CN | 101861257 B | 11/2012 |
| CN | 101868376 B | 3/2013 |
| CN | 102975661 A | 3/2013 |
| CN | 102177047 B | 2/2015 |
| DE | 2940095 A1 | 4/1981 |
| DE | 2950449 A1 | 6/1981 |
| DE | 3034226 A1 | 4/1982 |
| DE | 3201409 A1 | 9/1983 |
| DE | 3209912 A1 | 10/1983 |
| DE | 3614740 A1 | 11/1987 |
| DE | 3626479 A1 | 2/1988 |
| DE | 3637856 A1 | 5/1988 |
| DE | 8801618 U1 | 8/1988 |
| DE | 3912692 A1 | 11/1989 |
| DE | 4229268 A1 | 3/1994 |
| DE | 4423607 C1 | 6/1995 |
| DE | 20007760 U1 | 8/2000 |
| DE | 20309766 U1 | 9/2003 |
| DE | 202005007566 U1 | 7/2005 |
| EP | 0019873 B1 | 10/1982 |
| EP | 0091889 * | 3/1983 |
| EP | 0151907 A2 | 8/1985 |
| EP | 0193501 A2 | 9/1986 |
| EP | 0433495 A1 | 12/1989 |
| EP | 0482650 A1 | 4/1992 |
| EP | 0504588 A1 | 9/1992 |
| EP | 0511179 A1 | 10/1992 |
| EP | 0646074 B1 | 10/1996 |
| EP | 0398885 B2 | 6/1997 |
| EP | 0869879 A | 10/1998 |
| EP | 0894672 A1 | 2/1999 |
| EP | 0945307 A2 | 9/1999 |
| EP | 0989029 A1 | 3/2000 |
| EP | 1285817 A2 | 2/2003 |
| EP | 1340652 A1 | 9/2003 |
| EP | 1340653 A2 | 9/2003 |
| EP | 1422940 A1 | 8/2004 |
| EP | 1205358 B1 | 7/2005 |
| EP | 1568542 A1 | 8/2005 |
| EP | 1712420 A1 | 10/2006 |
| EP | 2334514 A | 6/2011 |
| EP | 2437961 A | 2/2012 |
| EP | 2507095 A | 10/2012 |
| EP | 2303641 B1 | 11/2012 |
| EP | 002172445-0001 | 4/2013 |
| EP | 002231878-0001 | 7/2013 |
| EP | 002343582-0001 | 1/2014 |
| EP | 002343756-0001 | 1/2014 |
| EP | 2200869 B1 | 4/2014 |
| EP | 2200867 B1 | 6/2014 |
| EP | 2758275 A | 7/2014 |
| EP | 2200868 B1 | 8/2014 |
| FR | 1400231 A | 4/1965 |
| FR | 2481209 A1 | 10/1981 |
| FR | 2501601 A1 | 9/1982 |
| FR | 2519305 A1 | 7/1983 |
| FR | 2600953 A1 | 1/1988 |
| FR | 2624808 A2 | 6/1989 |
| FR | 2632595 A1 | 12/1989 |
| FR | 2711346 A1 | 4/1995 |
| FR | 2752793 A1 | 3/1998 |
| GB | 886743 A | 1/1962 |
| GB | 1045619 A | 10/1966 |
| GB | 1311367 A | 3/1973 |
| GB | 2255463 A | 1/1993 |
| GB | 2277309 A | 10/1994 |

(56) References Cited

FOREIGN PATENT DOCUMENTS

| | | |
|---|---|---|
| GB | 2303344 A | 2/1997 |
| GB | 2475916 A | 6/2011 |
| JP | 33-53143 A | 3/1988 |
| JP | 9-20181 A | 1/1997 |
| JP | 10-250488 A | 9/1998 |
| JP | 2000-318538 A | 11/2000 |
| MX | 2011012988 A | 3/2012 |
| NZ | 551764 A | 3/2009 |
| NZ | 561809 A | 11/2009 |
| NZ | 561860 A | 4/2010 |
| NZ | 561811 A | 6/2010 |
| NZ | 571287 A | 3/2011 |
| NZ | 592162 A | 7/2012 |
| TW | 201111201 A | 4/2011 |
| WO | 9110581 A1 | 7/1991 |
| WO | 9202385 A1 | 2/1992 |
| WO | 9410007 A2 | 5/1994 |
| WO | 9624509 A1 | 8/1996 |
| WO | 9638336 A1 | 12/1996 |
| WO | 9702976 A1 | 1/1997 |
| WO | 9708017 A1 | 3/1997 |
| WO | 9810959 A1 | 3/1998 |
| WO | 9954168 A1 | 10/1999 |
| WO | 03006277 A1 | 1/2003 |
| WO | 2005021332 A1 | 3/2005 |
| WO | 2005102013 A2 | 11/2005 |
| WO | 2009038479 A1 | 3/2009 |
| WO | 2009038480 A1 | 3/2009 |
| WO | 2009041828 A1 | 4/2009 |
| WO | 2009158358 A1 | 12/2009 |
| WO | 2009158360 A1 | 12/2009 |
| WO | 2010030198 A1 | 3/2010 |
| WO | 2010141944 A1 | 12/2010 |
| WO | 2010144369 A1 | 12/2010 |
| WO | 2010148011 A1 | 12/2010 |
| WO | 2011084075 A1 | 7/2011 |
| WO | 2013036939 A1 | 3/2013 |
| WO | 2013040267 A1 | 3/2013 |
| WO | 2013164692 A2 | 11/2013 |
| WO | 2013165640 A1 | 11/2013 |
| WO | 2014022435 A1 | 2/2014 |

OTHER PUBLICATIONS

Roof Mounted Bike Racks sold by Bike Racks Plus. [Retrieved on Mar. 20, 2007]. © 2002-2005. Retrieved from the Internet <URL: http://www.bike-racks-plus.com/Roof_Mounted_Bike_Racks_y.htm>, 3 pages.

Rack Attack Portland's Blog, "Another hit from Yakima! The all new factory-compatible FrontLoader upright bike rack", Mar. 29, 2010, Retrieved from the Internet on Oct. 11, 2012, URL: http://rackattackportland.wordpress.com/2010/03/29another-hit-from-yakima-the-all-new-factory-compatible-frontloader-upright-bike-rack/, 3 pages.

Yakima FrontLoader upright bike rack review, Apr. 17, 2010, Retrieved from the Internet on Oct. 11, 2012, URL: http://carracks.blogspot.nl/2010/04/yakima-frontloader-upright-bike-rack.html, 2 pages.

ORS Racks direct.com, "Yakima FrontLoader Bike Rack Review Video by ORS Racks Direct", May 19, 2010, Retrieved from the Internet on Oct. 11, 2012, URL:http://www.youtube.com/watch?v=cu8rHM90Rdw, 9 pages.

Heinlen, Jerry, "Yakima FrontLoader Recall Information", Apr. 28, 2011, Retrieved from the Internet on Oct. 11, 2012, URL:http://firecall.yakima.com, 2 pages.

Yakima, "Frontloader", Oct. 11, 2012, Retrieved from the Internet on Oct. 11, 2012, URL:http://yakima.com/shop/bike/roof/frontloader#pr-header-8002103, 5 pages.

\* cited by examiner

US 10,202,083 B2

CROSSBAR-TO-VEHICLE COUPLER HAVING ADJUSTABLE TOE ANGLE

CROSS-REFERENCES

This application is based upon and claims the benefit under 35 U.S.C. § 119(e) of U.S. Provisional Patent Application Ser. No. 62/173,333, filed on Jun. 9, 2015, and U.S. Provisional Patent Application Ser. No. 62/175,192, filed on Jun. 12, 2015, which are incorporated herein, in their entireties, for all purposes.

The following related applications and materials are incorporated by reference, in their entireties, for all purposes: U.S. Pat. No. 6,905,053; U.S. Pat. No. 8,333,311; U.S. Pat. No. 8,393,508; U.S. Pat. No. 8,544,707; U.S. Pat. No. 9,132,782; U.S. patent application Ser. No. 15/167,774; U.S. patent application Ser. No. 15/170,326; and U.S. patent application Ser. No. 15/172,043.

FIELD

This disclosure relates to systems and methods for attaching cargo racks to vehicles. More specifically, the disclosed embodiments relate to crossbar-to-vehicle couplers having an adjustable toe angle feature.

INTRODUCTION

Popularity of recreational activities continues to grow, with a corresponding growth in the need for carrying recreational equipment and cargo on vehicles. Accordingly, various equipment carriers and accessories have been developed over the years, for recreational items such as bicycles, skis, surf boards, standup paddle boards, kayaks, and the like. Many such carriers and accessories are supported on rooftop racks.

Meanwhile, the number of different vehicle rooftop configurations has grown as well, with various shapes, sizes, and features depending on the make and model of the vehicle. For example, rooftop rails may be flush on the roof, raised, or not present at all. Similarly, rooftops themselves may be relatively flat or curved, and a width of the roof may change from front to back.

Rooftop racks typically include crossbars mounted to the vehicle roof, and the crossbars themselves may be of various shapes and sizes, from square to round to aerodynamic.

With all this variation, rooftop rack systems must typically incorporate a myriad of components customized to fit each style of roof and rooftop feature. A need exists for a simplified system of crossbars, support towers, and connection features, with a reduction in customized components.

Furthermore, vehicle rooftops' lateral edges are frequently angled as compared to the longitudinal axis of the vehicle. For example, some vehicle rooftops are hourglass-shaped or trapezoidal. A need exists for crossbar-to-vehicle couplers that can easily and simply accommodate for different roof-edge angles while maintaining a proper crossbar orientation.

SUMMARY

The present disclosure provides systems, apparatuses, and methods relating to crossbar-to-vehicle couplers for rooftop cargo racks. Crossbar-to-vehicle couplers according to the present teachings overcome the deficiencies described above by providing a selectable toe angle adjustment feature.

In some embodiments, a rack for carrying cargo on top of a vehicle may include a crossbar; and a coupler configured to mount an end portion of the crossbar on top of a vehicle, the coupler including a body having a first frame portion fixedly coupled to the crossbar, a second frame portion connected to the first frame portion, and a substantially continuous outer housing at least partially surrounding the first and the second frame portions, the outer housing fixed to only the first frame portion or to only the second frame portion, and a vehicle interface coupled to the second frame portion of the body, the vehicle interface configured to attach the coupler to the top of the vehicle; wherein the second frame portion is pivotable around a substantially vertical axis relative to the first frame portion to orient the vehicle interface at a plurality of different toe angles relative to the crossbar.

In some embodiments, a crossbar-to-vehicle coupler for mounting a cargo rack to a vehicle may include a body including an outer housing and a toe angle adjustment mechanism having a first frame portion pivotably coupled to a second frame portion; a crossbar interface clamp coupled to the first frame portion, the crossbar interface clamp configured to releasably secure the coupler to a crossbar; a vehicle interface coupled to the first frame portion, the vehicle interface configured to releasably secure the coupler to a vehicle feature; and a detent interface between the outer housing and the toe angle adjustment mechanism, the detent interface configured to selectively permit rotation of the first frame portion relative to the second frame portion among a plurality of discrete toe angles.

In some embodiments, a method for attaching a crossbar to a vehicle may include securing a crossbar to a crossbar-to-vehicle coupler using a crossbar interface clamp of the coupler, the coupler comprising a body including an outer housing and a toe angle adjustment mechanism having a first frame portion pivotably coupled to a second frame portion, wherein the crossbar interface clamp is fixedly coupled to the first frame portion and a vehicle interface is coupled to the second frame portion; orienting the vehicle interface of the coupler to a selected toe angle relative to the crossbar by pivoting the second frame portion around a pivot axis normal to a long axis of the crossbar using a detent interface of the coupler, the detent interface comprising the outer housing and the toe angle adjustment mechanism and configured to selectively permit rotation of the first frame portion relative to the second frame portion among a plurality of discrete toe angles including the selected toe angle; and securing the vehicle interface of the coupler at the selected toe angle relative to the crossbar by fixing the first frame portion relative to the second frame portion.

Features, functions, and advantages may be achieved independently in various embodiments of the present disclosure, or may be combined in yet other embodiments, further details of which can be seen with reference to the following description and drawings.

DESCRIPTION

Figure 1:
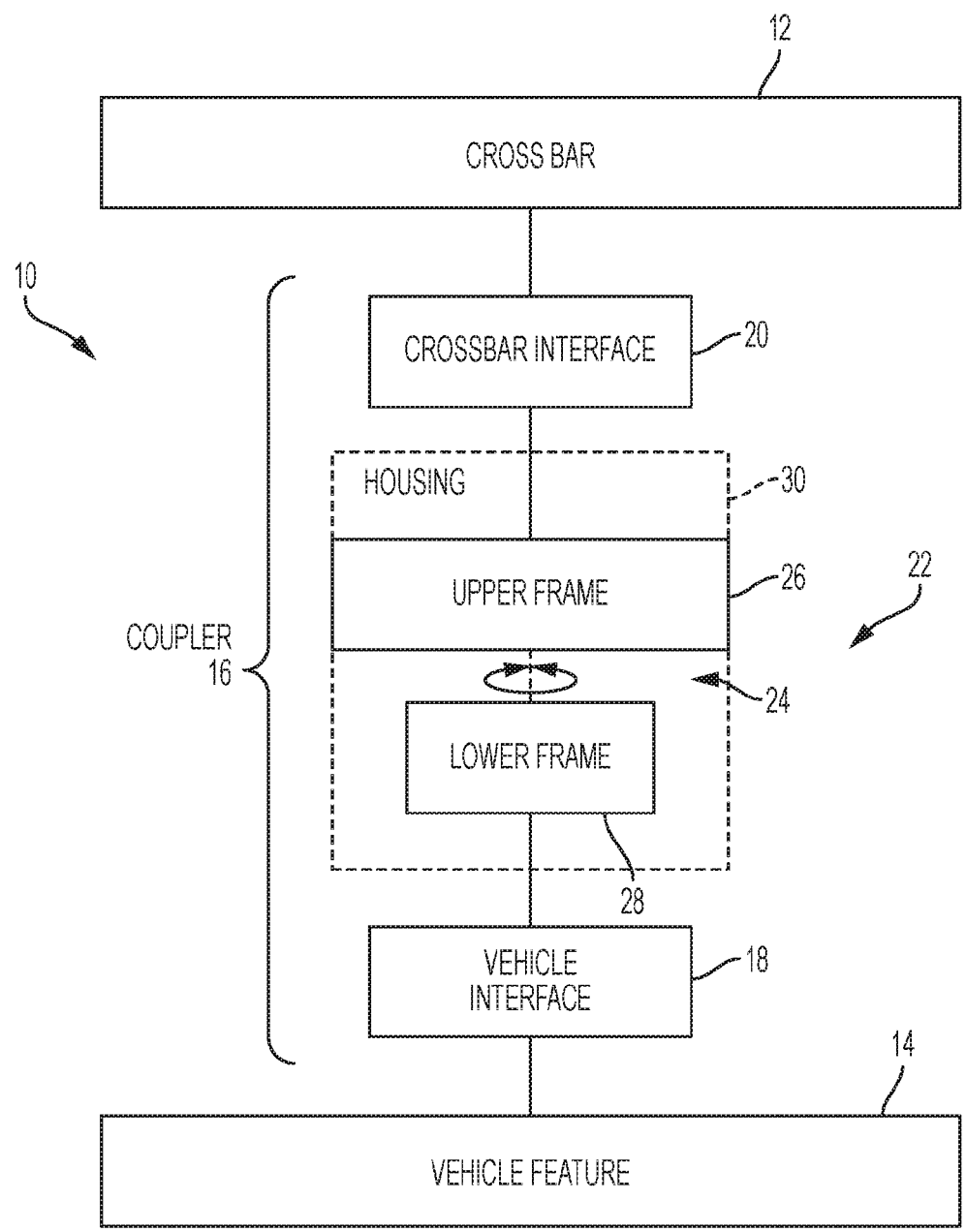
FIG. 1 is a schematic block diagram of a rooftop cargo rack system.

Various aspects and examples of a crossbar-to-vehicle coupler having a selectively adjustable toe angle, as well as related methods, are described below and illustrated in the associated drawings. Unless otherwise specified, an adjustable-toe coupler and/or its various components may, but are not required to, contain at least one of the structure, components, functionality, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed embodiments. The following description of various examples is merely illustrative in nature and is in no way intended to limit the disclosure, its application, or uses. Additionally, the advantages provided by the examples and embodiments described below are illustrative in nature and not all examples and embodiments provide the same advantages or the same degree of advantages.

Definitions

The following definitions apply herein, unless otherwise indicated.

"Comprising," "including," and "having" (and conjugations thereof) are used interchangeably to mean including but not necessarily limited to, and are open-ended terms not intended to exclude additional, unrecited elements or method steps.

Terms such as "first", "second", and "third" are used to distinguish or identify various members of a group, or the like, and are not intended to show serial or numerical limitation.

The terms "inboard," "outboard," "forward," and "aft" (and the like) are intended to be understood in the context of a host vehicle on which systems described herein may be mounted or otherwise attached. For example, "outboard" may indicate a relative position that is laterally farther from the centerline of the vehicle, or a direction that is away from the vehicle centerline. Conversely, "inboard" may indicate a direction toward the centerline, or a relative position that is closer to the centerline. Similarly, "forward" means toward the front portion of the vehicle, and "aft" means toward the rear of the vehicle. In the absence of a host vehicle, the same directional terms may be used as if the vehicle were present. For example, even when viewed in isolation, a crossbar may have a "forward" edge, based on the fact that the edge in question would be installed facing the front portion of a host vehicle.

The term "toe" or "toe angle" is analogous to the yaw of an aircraft, and refers to the pivoting of an object about a substantially vertical or normal axis, such that the object rotates left or right. The toe angle is a measurement of this rotation, relative to a given frame of reference (e.g., a forward direction of travel, another object, arbitrarily defined reference axes, etc.). For example, object A could have a certain toe angle with respect to an aspect of object B, or with respect to a defined reference direction, among other examples.

Accordingly, in some examples, the toe of a crossbar-to-vehicle coupler mounted on a vehicle may be defined with respect to a forward direction of travel of the vehicle, or to a longitudinal axis of the vehicle, or to a long axis of the crossbar. For example, sides of a vehicle rooftop are sometimes angled to produce a variable width roof. For the coupler and crossbar to be properly oriented on the vehicle, the coupler may need to be rotated about a vertical axis relative to the crossbar it is supporting. In some examples, the coupler may comprise multiple parts that are rotated or rotatable relative to each other, e.g., a vehicle interface portion and a crossbar interface portion. Accordingly, the toe angle may be defined and/or effected between the two parts of the coupler (i.e., intra-coupler).

Overview of a Roof Rack System

In general, and with reference to FIG. 1, a vehicle roof rack system 10 may include any suitable combination of components configured to provide a selected crossbar securely affixed to a vehicle rooftop. The crossbar is supported at either end by a pair of supports having features that facilitate attachment to corresponding feature(s) on the specific vehicle. The crossbar supports may also be referred to as towers, feet, or mounts, and are referred to herein as couplers and/or coupler assemblies. A versatile and efficient system may be provided to fit a selected crossbar to the wide range of vehicle rooftops present in the marketplace.

Accordingly, roof rack system 10 may include one or more types of crossbars 12 suitable for use on a range of vehicles. Each type of crossbar 12 may include any suitable crossbar configured to be mounted transverse to the long axis of a vehicle, across a rooftop, and to support loads placed thereon. For example, a crossbar 12 may support a bicycle carrier, ski carrier, kayak carrier, and the like. Crossbars are typically mounted on a vehicle in pairs, such that a forward and an aft crossbar are present on the vehicle for proper load carrying. Crossbars 12 may have any suitable cross section, such as round, square, teardrop, aerodynamic, and/or any other suitable shape or combination of shapes.

Crossbars 12 are supported by attaching or fastening each of the crossbars to one or more specific vehicle features 14. Vehicles come in many shapes and sizes, with a corresponding array of roof topologies. Vehicle features 14, to which the crossbars may be attached, can include raised rails running along lateral sides of a rooftop, flush rails with no space between the rails and the roof, channels or hard points on the roof, side edges or gutters of a naked roof, and/or the like.

To fasten the outboard ends of the crossbars to features 14, system 10 may include one or more couplers 16, also referred to as supports, towers, feet, or mounts, as mentioned above. Each coupler 16 may include any suitable vehicle interface 18 configured to attach, clamp, and/or removably connect to one or more vehicle features 14. Each coupler 16 may also include any suitable crossbar interface 20 configured to provide an attachment point or mount for a crossbar 12.

In some examples, crossbar interface 20 may include an interface for connecting a variety of crossbars. For example, crossbar interface 20 may include a threaded bolt protruding upward from support 16. Each specific crossbar 12 may include or be associated with a bar connector (also referred to as an adapter) configured to provide a crossbar-specific bar clamp when combined with a bar seat.

The bar clamp may be used to removably and securely attach crossbar 12 to coupler 16. For example, the bar connector may comprise a movable capturing portion configured to secure the crossbar against the seat portion. Accordingly, crossbar interface 20 of coupler 16 includes a clamp actuator configured to tighten, draw together, or otherwise cause the crossbar clamp to securely engage the crossbar. The bar clamp actuator may include a manual actuator or manual actuating mechanism. Suitable bar clamps and actuators are described, for example, in U.S. patent application Ser. No. 15/167,774, the entirety of which is hereby incorporated herein for all purposes.

In some examples, coupler 16 may include a body or body portion 22 providing structural and/or other functional aspects of the coupler, e.g., locking devices, environmental, aesthetic, and/or aerodynamic outer housing features, internal support structure, etc. Vehicle interface 18 and/or crossbar interface 20 may be attached, unitary with, and/or coupled to coupler body portion 22. Alternatively or additionally, crossbar interface 20 and vehicle interface 18 may be coupled to each other.

For some vehicles and/or vehicle features, the vehicle roof and/or vehicle features 14 are angled. In these examples, installing crossbar 12 with its long axis at a right angle to the longitudinal axis of the vehicle will cause crossbar 12 to be at an acute or obtuse toe angle with respect to vehicle features 14. Accordingly, coupler 16 may include an adjustable toe angle mechanism 24 that allows vehicle interface 18 to be oriented differently, toe-wise, than crossbar interface 20.

Toe angle mechanism 24 may include any suitable structures configured to be rotated around a substantially vertical axis, such that a first of the structures is at a first toe angle and a second of the structures is at a second toe angle. For example, mechanism 24 may include an upper frame 26 of coupler body 22 pivotably coupled to a lower frame 28 of coupler body 22. An outer housing 30 of the coupler may be attached to one of the frames. In some examples, the housing is attached such that the housing rotates in tandem with one frame and rotates around the other frame. In some examples, the housing is attached such that the housing remains stationary while the other frame rotates within the housing. The lower frame may be described as stationary, because of its attachment (through the vehicle interface) to the vehicle (i.e., the larger of the two objects being coupled). However, either frame may be described as stationary and/or rotating with respect to the other frame, depending on the situation. In some examples, the upper and lower frame are securable in a plurality of toe orientations (e.g., continuous or discrete orientations).

Vehicle interface 18 may include any suitable structure and/or device configured to removably attach to a given vehicle feature (or features) 14. For example, vehicle interface 18 may include a clamp, hook, bolt, clip, strap, and/or the like, and/or any combination of these. To provide an efficient and versatile system, a selected number of vehicle interface types may be provided, some having modifiable or selectable components for further customization. Specific examples of vehicle interfaces 18 are mentioned below, such as in the discussion regarding FIG. 15.

Accordingly, system 10 may allow a user to choose a crossbar 12, select a coupler 16 having a vehicle interface 18 appropriate for attachment to vehicle feature 14 of the user's vehicle, and clamp the crossbar to the support using a corresponding bar connector and bar seat.

Figure 2:
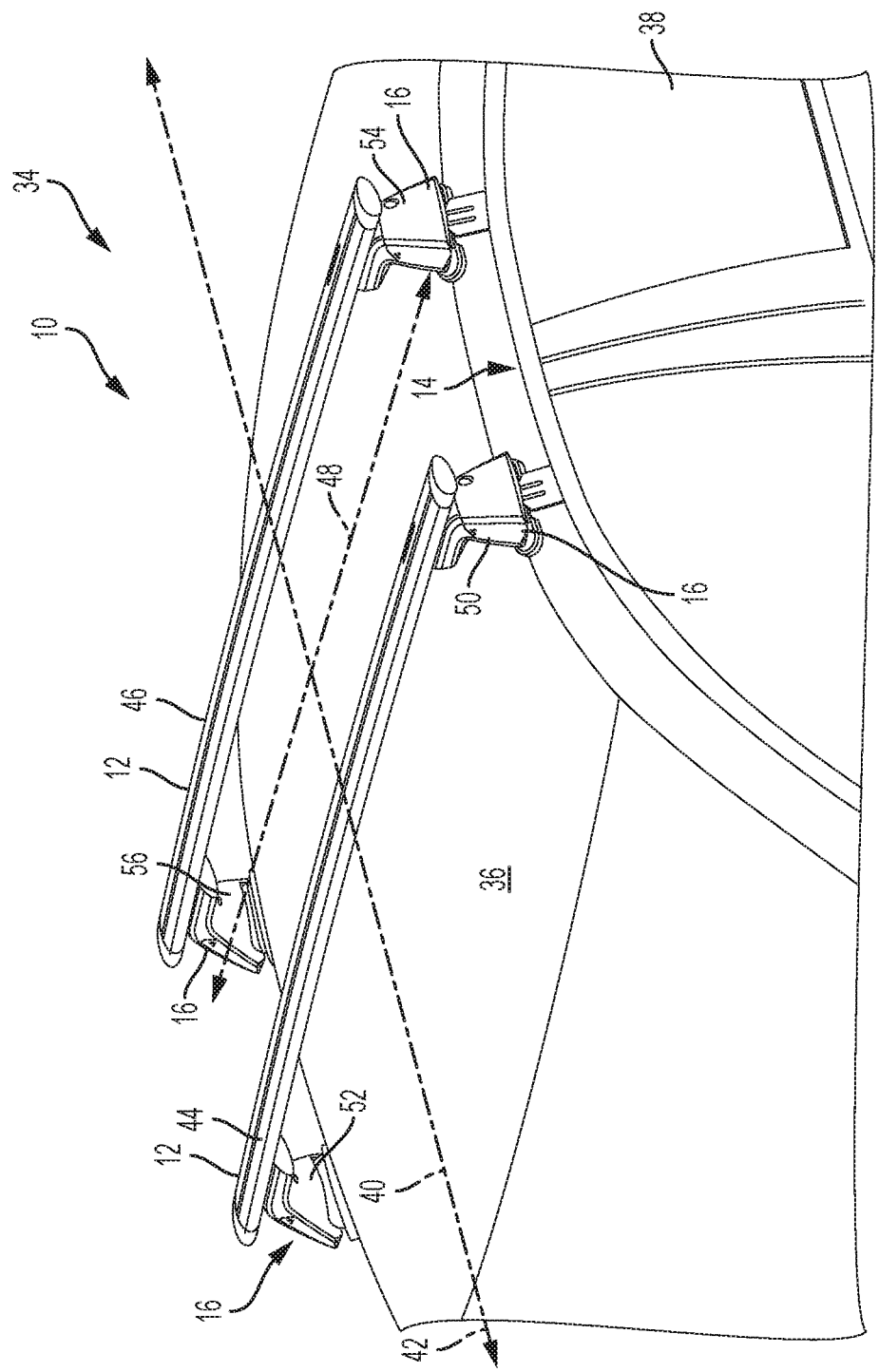
FIG. 2 is an oblique isometric view of a portion of an illustrative vehicle showing an illustrative rooftop rack mounted thereon.

Turning to FIG. 2, a roof rack 34 is depicted, attached to an illustrative roof 36 of a vehicle 38. Roof rack 34 is a selected example of roof rack 10, described above. Accordingly, similar components may be labeled with similar reference numbers. Rack 34 may be used for carrying cargo and/or cargo-specific accessories on top of vehicle 38. Vehicle 38 has an longitudinal or central axis 46 generally coinciding with (e.g., running parallel to) a direction of vehicular travel 42.

Rack 34 includes a pair of crossbars 44 and 46 having aerodynamic shapes and attached to vehicle roof 36. Each crossbar is supported and mounted on vehicle 38 by a respective pair of couplers configured to mount the crossbar on top of the vehicle with the crossbar substantially perpendicular to longitudinal axis 40. Accordingly, crossbars 44 and 46 are substantially parallel to each other and oriented across a width of the vehicle roof, as generally indicated by a lateral axis 48 in FIG. 2. Crossbar 44 is mounted on top of the vehicle by couplers 50 and 52, and crossbar 46 is mounted on top of the vehicle using couplers 54 and 56. In this example, couplers 50, 52, 54, 56 have an adjustable clip style of vehicle interface configured to clamp onto side edges or gutters of the vehicle roof. Other styles may be suitable, and other vehicle features may be present.

Figure 3:
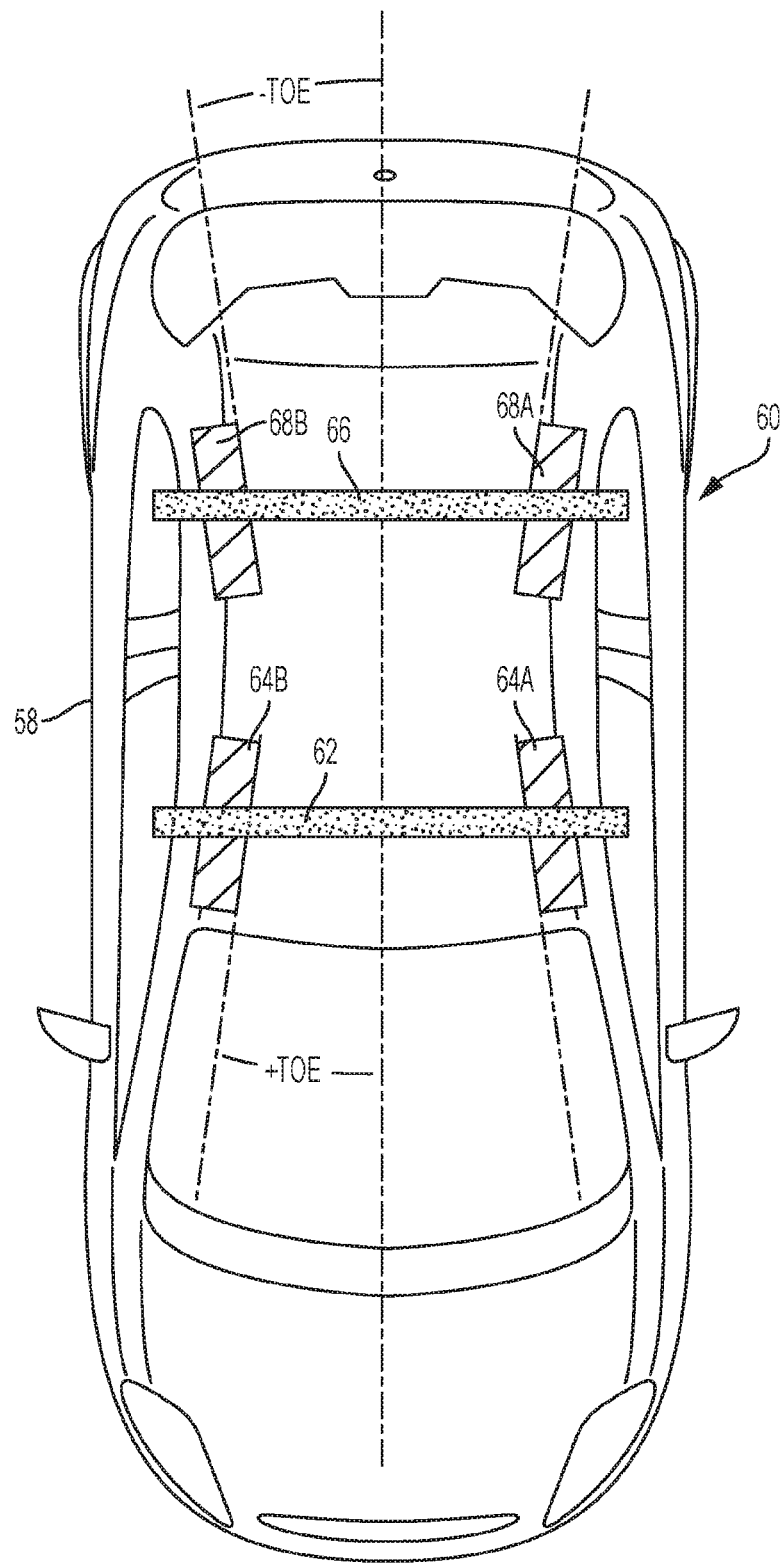
FIG. 3 is a schematic top view of a vehicle having a rooftop rack and depicting illustrative toe angles.

FIG. 3 is a schematic top view of a vehicle 58 having a rack 60 mounted on its roof. Rack 60 includes a forward crossbar 62 mounted to vehicle 58 by couplers 64A and 64B, and an aft crossbar 66 mounted to vehicle 58 by couplers 68A and 68B. As depicted in FIG. 3, crossbars 62 and 66 are mounted across the vehicle at a right angle (i.e., orthogonal) to the longitudinal axis of vehicle 58. However, due to the generally hourglass shape of the roof of vehicle 58, the couplers all have non-neutral toe angles. In other words, to attach to the side of the roof, a lower portion of the coupler must be rotated into alignment with the local roof edge, while an upper portion of the coupler remains aligned with the crossbar.

Examples, Components, and Alternatives

The following sections describe selected aspects of exemplary adjustable-toe couplers, as well as related systems and/or methods. The examples in these sections are intended for illustration and should not be interpreted as limiting the entire scope of the present disclosure. Each section may include one or more distinct inventions, and/or contextual or related information, function, and/or structure.

Schematic Example

Figure 4:
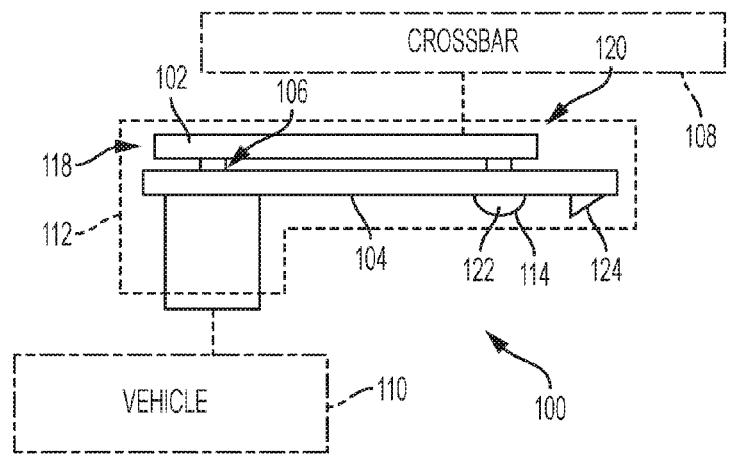
FIG. 4 is a schematic side elevation view of selected aspects of a crossbar-to-vehicle coupler having an intra-coupler toe adjustment mechanism in accordance with aspects of the present disclosure.
Figures 5, 6:
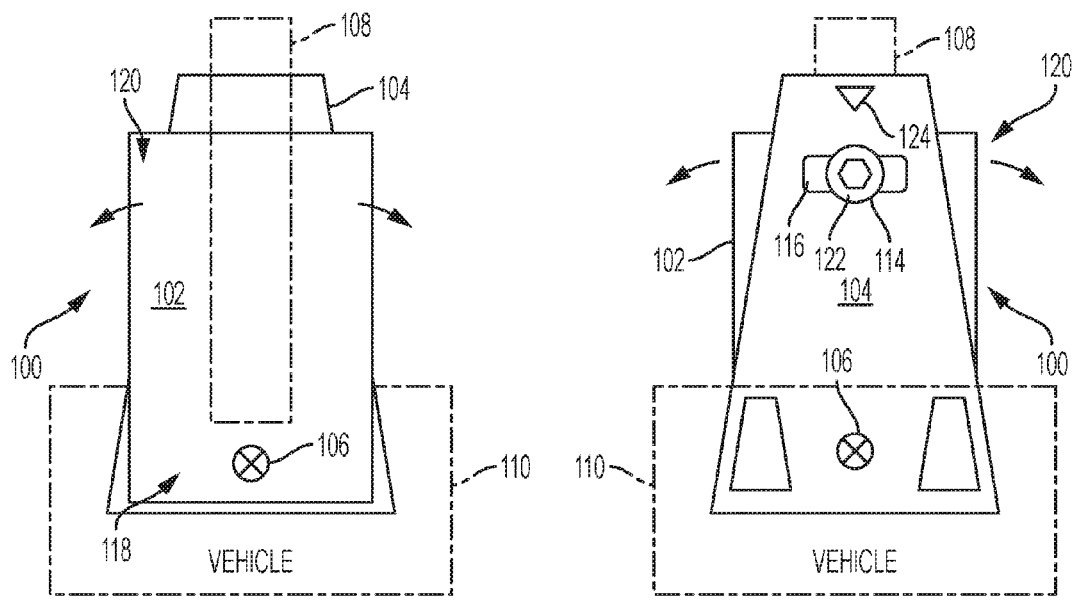
FIG. 5 is a top plan view of the coupler of FIG. 4.
FIG. 6 is a bottom plan view of the coupler of FIG. 4.

As shown schematically in FIGS. 4-6, this section describes an illustrative crossbar-to-vehicle coupler assembly 100 having an adjustable toe angle. Coupler assembly 100 (also referred to as coupler 100) is an example of coupler 16, described above.

FIG. 4 is a forward (or aft) side elevation view of coupler 100. FIG. 5 is an overhead plan view of coupler 100, and FIG. 6 is a bottom plan view of coupler 100.

As schematically indicated in FIGS. 4-6, the body of coupler 100 includes a first (e.g., upper) frame portion 102 pivotably attached to a second (e.g., lower) frame portion 104 at a pivot joint 106. The first and second frame portions are configured to pivot around a substantially vertical pivot axis (i.e., at joint 106). A crossbar 108 may be clamped or otherwise fixed (e.g., indirectly) to first frame portion 102. Furthermore, second frame portion 104 may be clamped or otherwise fixed (e.g., indirectly) to a vehicle feature 110. Accordingly, a toe angle of crossbar 108 can be adjusted relative to vehicle feature 110 by pivoting first frame portion 102 relative to second frame portion 104. Said another way, a toe angle of the coupler can be adjusted to accommodate the situation where the vehicle feature and crossbar are not situated at a right angle. The toe angle may be adjustable intra-coupler, as in this example, such that the first and second frame portions are rotated about the pivot axis with respect to each other (i.e., within the coupler itself).

Coupler 100 may include additional components and features not shown in FIGS. 4-6. For example, coupler 100 may include one or more clamps, interfaces, housings, etc., such as the coupler components described in the Overview section above. For example, an outer housing 112 is shown schematically in FIG. 4. Housing 112 may be coupled to frame portion 102 and/or frame portion 104. In some examples, housing 112 may rotate with the upper frame portion. In some examples, housing 112 may remain stationary while one or both frame portions rotate within the housing.

First frame portion 102 and second frame portion 104 may each include any suitable structural frames, frameworks, struts, plates, trusses, mounts, and/or the like, or any combination of these, for providing structural integrity and load-bearing support, as well as attachment points for other coupler components.

As shown in FIGS. 4 and 6, relative pivoting or rotation of the frame portions may be limited to a certain range. A pin or bolt 114 may protrude from first frame portion 106 and pass through a slot or elongate opening 116 in second frame portion 104. First frame portion 102 may have a pivoting end portion 118 (also referred to as a distal end) and a free end portion 120 (also referred to as a distal end). Bolt 114 may be threaded into a lower surface of free end portion 120, such that bolt 114 first passes through slot 116 in second frame portion 104. Slot 116 limits how far the upper frame portion can pivot relative to the lower frame portion, because rotation will be arrested when bolt 114 reaches either end of the slot. A head 122 of bolt 114 may facilitate tightening of the bolt, such that head 122 abuts the lower surface of the second frame portion, thereby clamping (i.e., securing) the frame portions together in a selected orientation.

Pivot joint 106 may include any suitable joint configured to pivot, rotate, or hinge around a substantially vertical axis. Pivoting may be free-rotating, or may be biased, such as by a spring or other self-centering mechanism. A detent mechanism may be integrated into pivot joint 106, such that selected rotational orientations are mechanically preferred. In other examples, a detent mechanism may be included in free end portion 120.

A projecting member 124 may be included in a free end of lower frame portion 104. Projecting member 124 may include any suitable protrusion configured to facilitate indication and/or selection of the toe angle. For example, member 124 may indicate a selected toe angle when compared to an aspect of outer housing 112. In some examples, member 124 may be used to manually reposition the housings and/or as part of the detent mechanism, if included.

Illustrative Crossbar-to-Vehicle Coupler

As shown in FIGS. 7-12, this section describes an illustrative crossbar-to-vehicle coupler 130 having an adjustable toe angle mechanism. Coupler 130 is substantially similar to couplers 64A, 64B, 68A, 68B shown in FIG. 2, and is a specific example of coupler 16 and coupler 100, described above.

Figure 7:
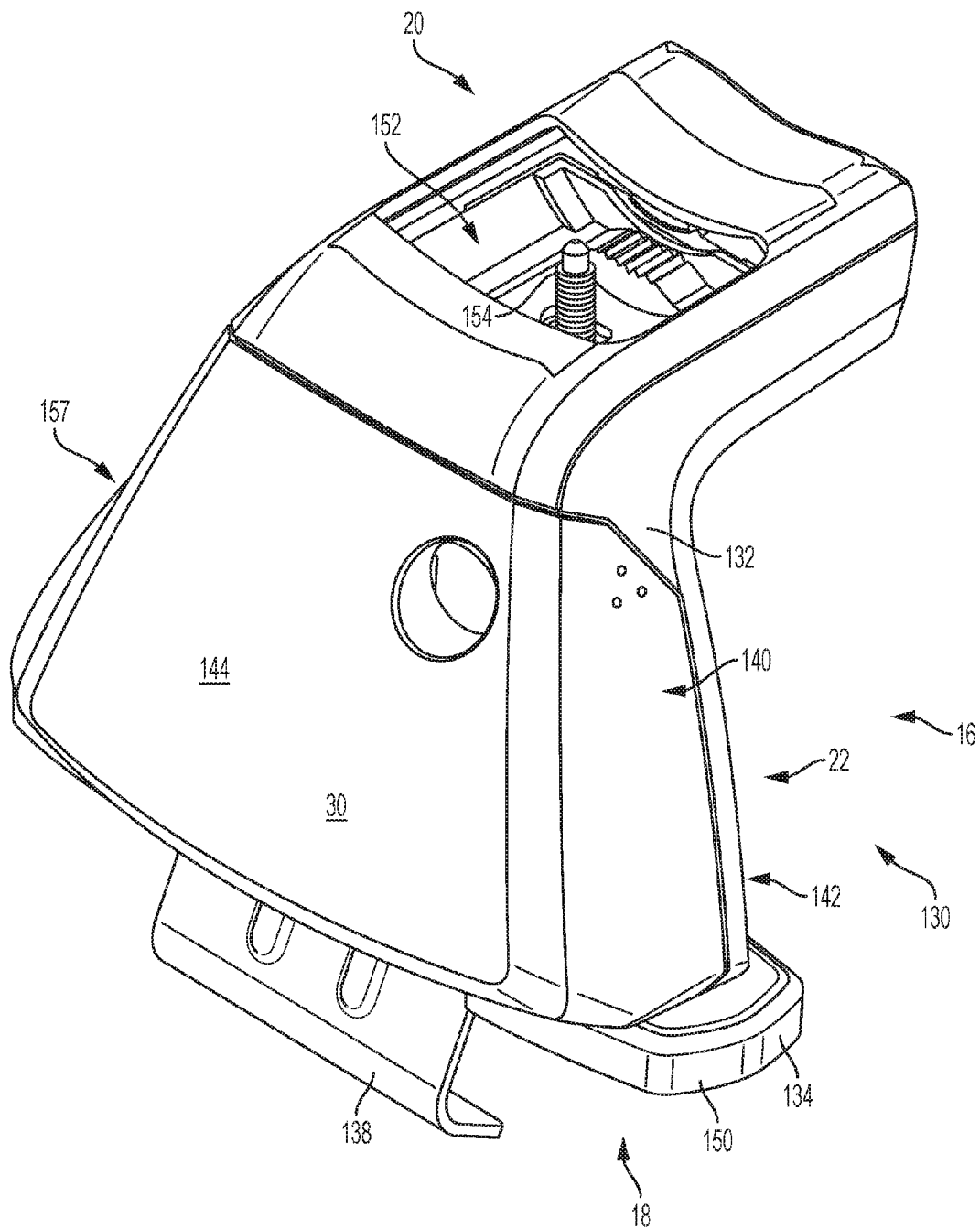
FIG. 7 is an oblique isometric view of an illustrative crossbar-to-vehicle coupler in accordance with aspects of the present disclosure, with an upper crossbar clamp portion removed.
Figure 8:
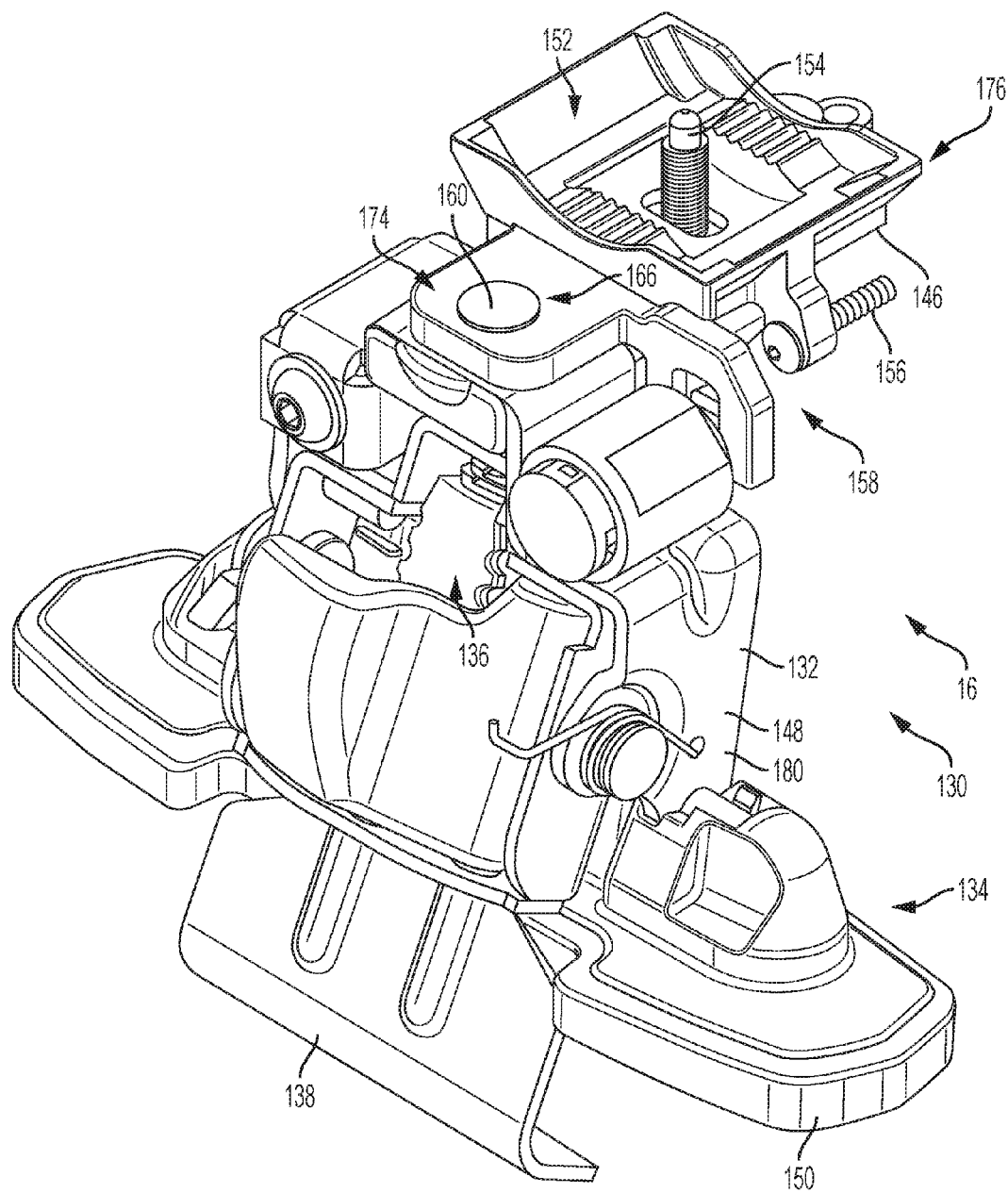
FIG. 8 is an oblique isometric view of the coupler of FIG. 7 with an outer housing removed to show relationships between selected internal components.
Figure 9:
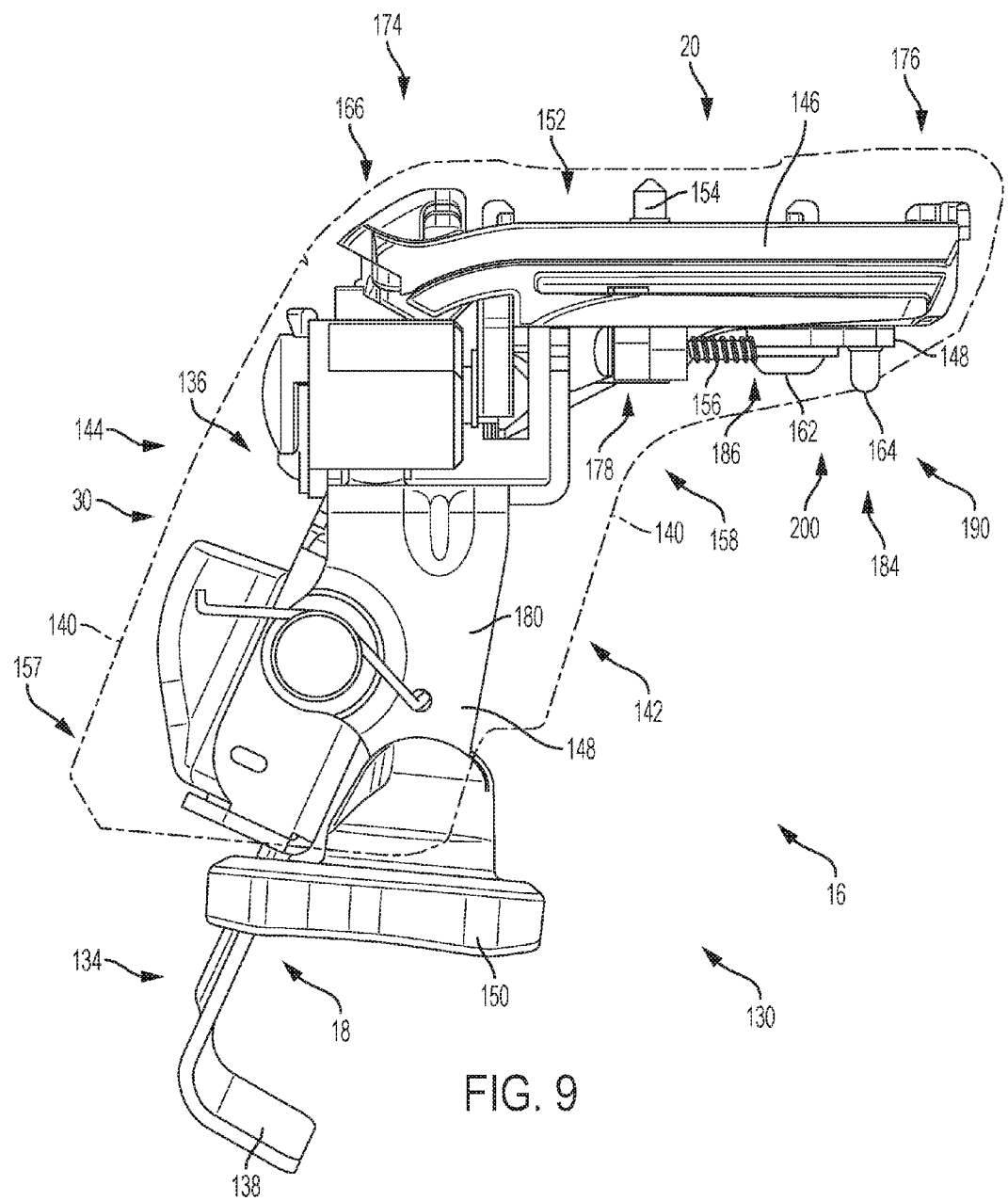
FIG. 9 is a side elevation view of the coupler of FIG. 7, with the outer housing shown in phantom lines.

FIGS. 7 and 8 are oblique isometric views of crossbar-to-vehicle coupler 130 with the interchangeable crossbar clamp removed for simplicity. FIG. 7 is a view of the assembled coupler, while FIG. 8 shows the coupler with an outer housing portion removed to reveal internal components. FIG. 9 is a side elevation view of coupler 130, showing the outer housing in phantom lines.

Coupler 130 includes a coupler body 132, a base portion 134, a clip retention and adjustment mechanism or assembly 136, and a clip 138. Coupler body 132 may include an outer housing 140 comprising an inboard cover 142 and a removable outboard cover 144, an upper (e.g., first) frame 146, and a lower (e.g., second) frame 148. Together, the inboard and outboard covers may protect portions of coupler 130 against the environment, may selectively prevent access to other components of the coupler, and may present an aesthetic and/or aerodynamic outer surface. The upper and lower frames may provide structural support for the coupling assembly. As described further below, the upper and lower frames may be pivotally/pivotably mounted to one another, thereby facilitating a toe angle adjustment of the coupler assembly, as described above in reference to FIGS. 4-6 and elsewhere.

Base portion 134 may be hingedly coupled to body 132 (e.g., pivotable around an axis parallel to the vehicle roof), and may include a base pad 150 configured to abut or otherwise make supportive and/or bracing contact with the roof of the vehicle. Base pad 150 may be constructed of a resilient material, such as rubber, and may prevent damage to the roof. The base pad may be one of an interchangeable set of base pads, with each base pad configured to be coupled to the base portion and configured to be used on the roof of a particular vehicle or set of vehicles. With clip 138, base portion 134 comprises vehicle interface 18 for coupler 130.

Clip retention and adjustment mechanism 136 includes components and structures configured to facilitate adjustment of clip 138 relative to body 132, such that clip 138 and base portion 134 cooperatively clamp the coupler onto the vehicle roof. Additional details and examples of coupler 130, including components of the clip retention and adjustment mechanism, are described in U.S. application Ser. No. 15/170,326, the entirety of which is hereby incorporated herein, for all purposes.

Upper frame 146 includes an upper support surface 152 and clamp interface bolt 154. A crossbar clamp (not shown) may be attached to coupler 130 by interface bolt 154. A portion of the clamp rests on upper support surface 152, and can be selectively pivoted on curved, toothed portions of the support surface, e.g., in discrete orientations, to effect different pitch angles of the crossbar. The clamp may be actuated by manipulation of interface bolt 154, e.g., by exerting a downward force on and/or using bolt 154. Examples of suitable clamps, clamp actuators, and related systems and methods may be found in U.S. patent application Ser. Nos. 15/172,043 and 15/167,774.

Outer housing 140 is fastened to upper frame 146 by a pair of screws or bolts 156. This arrangement has at least two results. First, outer housing 140 will pivot with (or stay stationary with) the upper frame, relative to the lower frame. Outer housing 140 and lower frame 148 are therefore configured to move substantially independently, such that the outer housing and lower frame do not interfere with each other over a range of toe adjustments. In this regard, in some examples (e.g., as shown in FIGS. 7 and 9), outer housing 140 may form a skirt 157 laterally surrounding part of the lower frame. Second, relative motion between the lower frame and the outer housing may be utilized for additional functionality, e.g., by taking advantage of the fact that the outer housing effectively functions as an extension of the upper frame. For example, a portion of lower frame 148 may mechanically interface with outer housing 140, such as to provide position indication and/or a detent feature (as described below).

Figure 10:
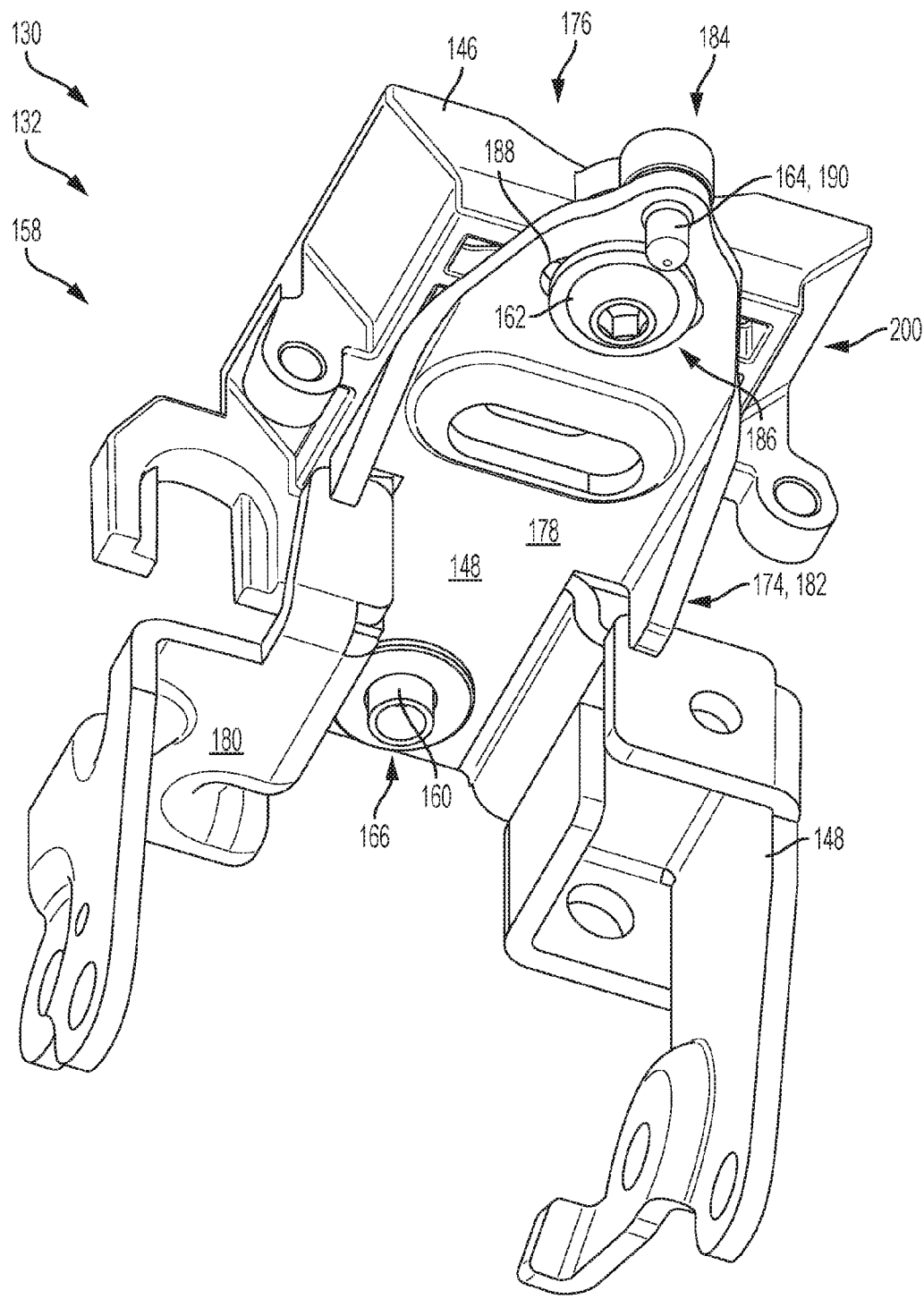
FIG. 10 is a lower oblique isometric view of a toe adjustment portion of the coupler of FIG. 7.
Figure 11:
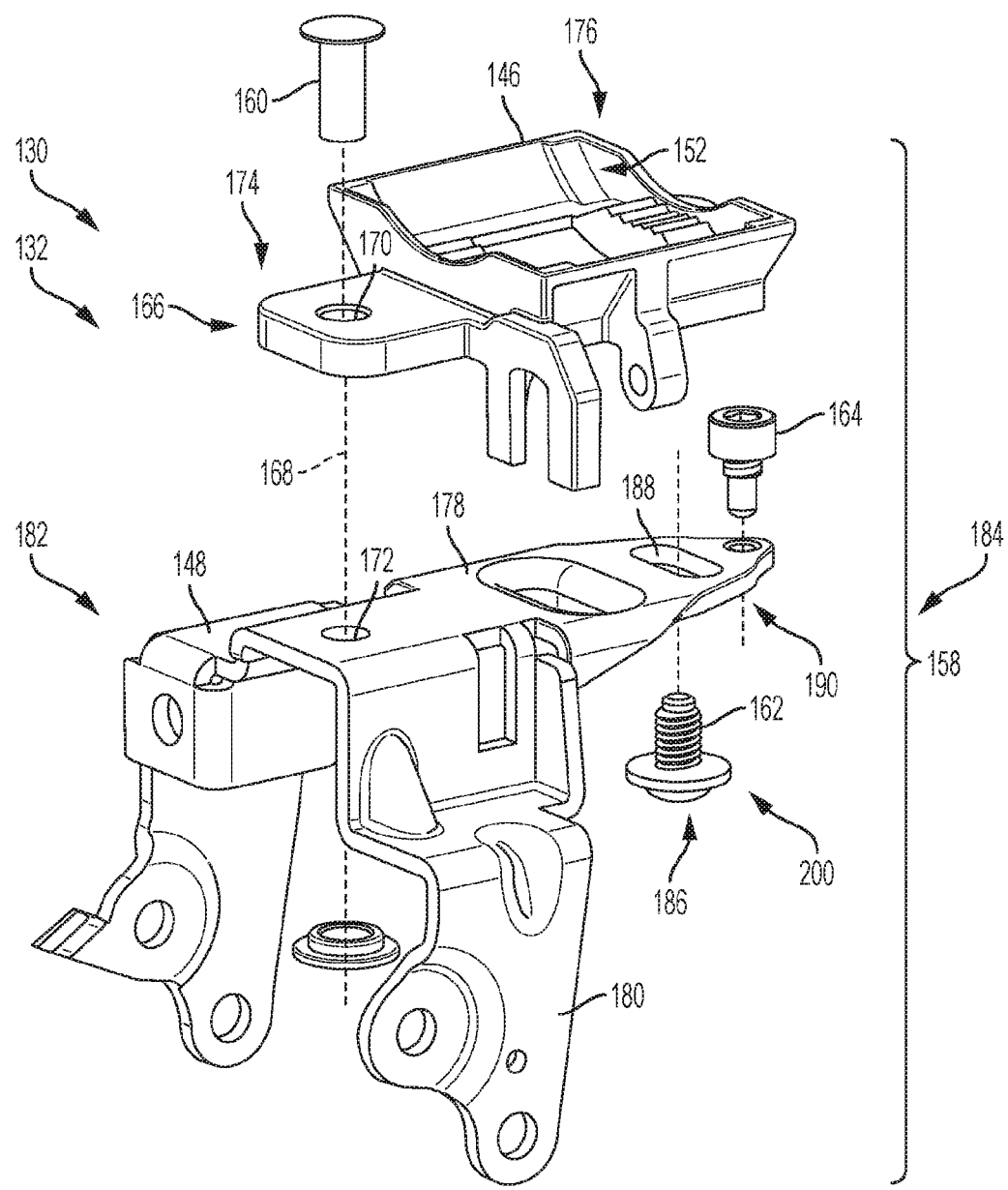
FIG. 11 is an upper oblique isometric exploded view of the toe adjustment portion of FIG. 10.

A toe adjustment mechanism 158 of coupler 130 comprises upper frame 146 and lower frame 148, as well as a pivot axle 160, an adjustment bolt 162, and an indication and detent member 164. Toe adjustment mechanism 158 is an example of adjustable toe angle mechanism 24, described above. FIGS. 10 and 11 are views that isolate the toe adjustment mechanism of coupler 130, showing relationships between related components and aspects of the frames. FIG. 9 is a lower oblique isometric view of toe adjustment mechanism 158. FIG. 10 is an upper oblique, isometric, exploded view of toe adjustment mechanism 158.

As depicted in FIGS. 10-11, upper frame 146 is pivotably attached to lower frame 148 at a pivot joint 166 using pivot axle 160, such that the upper and lower frames are mutually rotatable around a substantially vertical axis 168 (e.g., an axis perpendicular to the long axis of the crossbar, when installed). Pivot axle 160 may include any suitable structure configured to provide a pivot for the two frames, such as a shaft, pin, axle, spindle, rod, and/or the like. Pivot axle 160 may comprise a bearing surface. In this example, axle 160 comprises a metal rivet, the shaft of which passes through a pair of aligned apertures 170 and 172 in the upper and lower frames, respectively.

Upper frame 146 is a rigid, plate-like structure having a pivot (or proximal) end portion 174 that includes pivot joint 166, and a free (or distal) end portion 146 that swings back and forth. As described above, upper frame 146 includes upper support surface 152.

Lower frame 148 is a rigid structure having a plate-like portion 178 that generally faces and parallels upper frame 146 and a leg portion 180 that depends from portion 178 to add height to the coupler body (e.g., to raise the crossbar above the vehicle roof). As with the upper frame, portion 178 of lower frame 148 has a pivot (or proximal) end portion 182 that includes pivot joint 166, and a free (or distal) end portion 184 that swings back and forth. Leg portion 180, being generally disposed on an opposite side of pivot joint 166 from the distal end, may swing in an opposite direction as compared to distal end 184. Leg portion 180 may include a plurality of legs, such as two legs.

Rotation of the upper and lower frames relative to each other may be secured at a selected angle of rotation, by a frame securement mechanism 186. Frame securement mechanism 186 may be disposed at the distal end portions of the frames. For example, as shown in FIGS. 10 and 11, adjustment bolt 162 (also referred to as a screw or threaded member) may project from the upper frame portion through an elongated slot or hole 188 in the lower frame portion. The frame portions may be secured from rotating relative to each other by securing or clamping the two frames together. For example, bolt 162 may have a released (e.g., loosened) configuration, in which upper frame 146 and lower frame 148 are free to rotate, and a tightened configuration, in which the two frames are fixed together. In the released configuration, the threaded member is allowed to slide back and forth in elongated hole 188.

Figure 12:
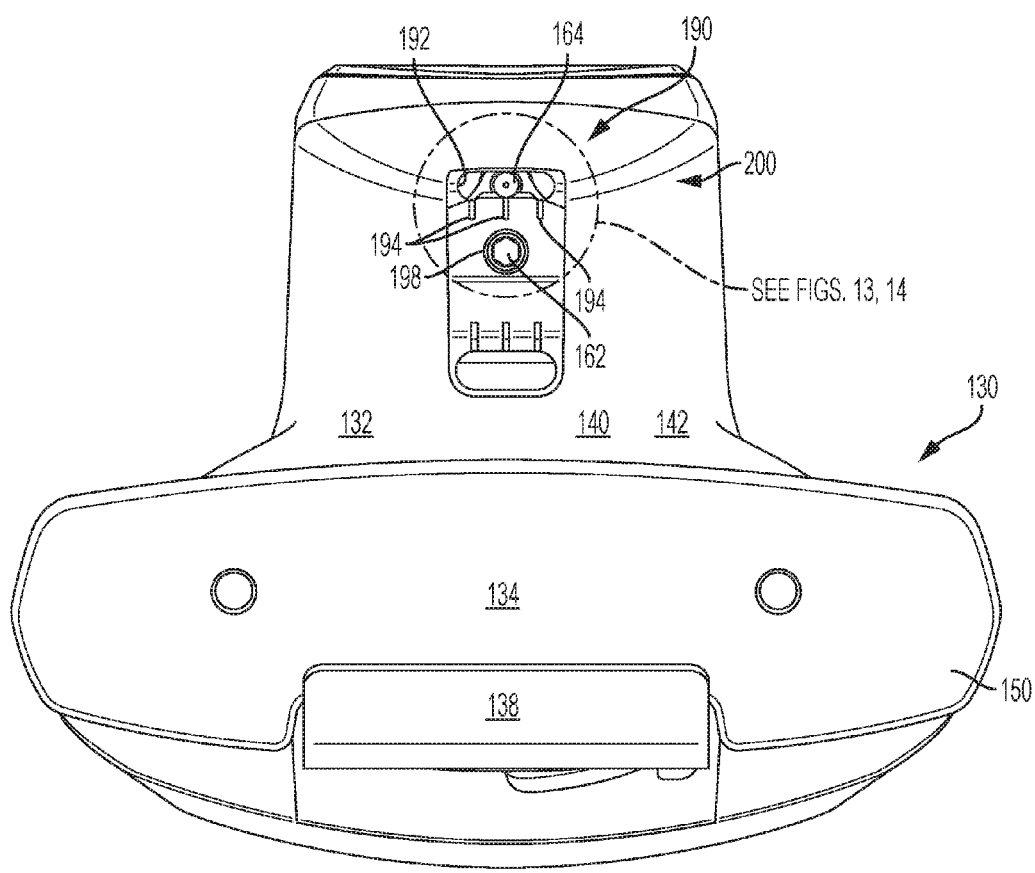
FIG. 12 is a bottom view of the coupler of FIG. 7, showing an illustrative detent mechanism and toe angle securement mechanism in accordance with aspects of the present disclosure, in which the toe angle is selected to a first discrete orientation.
Figure 13:
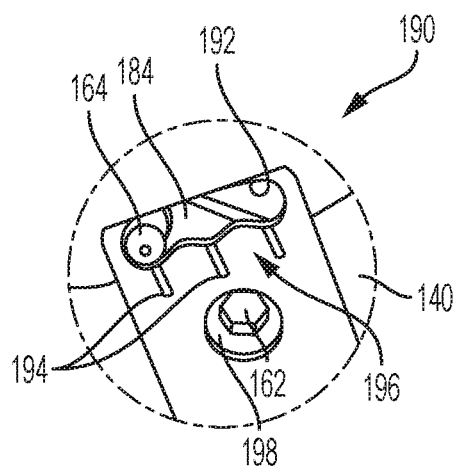
FIG. 13 is a magnified partial view of the detent mechanism of FIG. 12, in which the toe angle is selected to a second discrete orientation.
Figure 14:
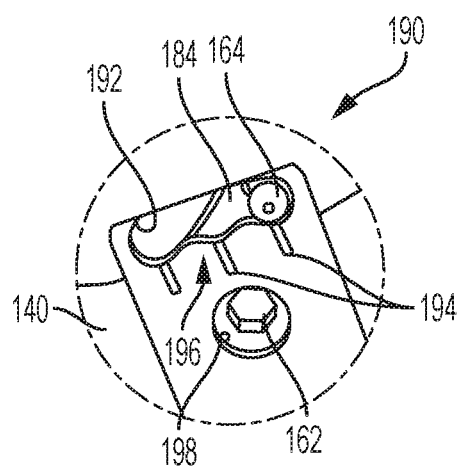
FIG. 14 is a magnified partial view of the detent mechanism of FIG. 12, in which the toe angle is selected to a third discrete orientation.

With continuing reference to FIGS. 10-11, and now with reference to FIGS. 12-14, coupler 130 may include a detent interface 190 between outer housing 140 and toe angle adjustment mechanism 158. FIG. 12 is a bottom view of coupler 130, with the outer housing installed. FIGS. 13 and 14 are partial magnified views of detent interface 190, showing the interface in different configurations, as described below.

Detent interface 190 may include indication and detent member 164, which is another elongate member projecting from free end 176 of the lower frame. Member 164 is shown in this example as a partially threaded screw installed in the lower frame. In some examples, member 164 may be unitary with or otherwise attached to lower frame 148. Member 164 may project downward from the lower frame through a shaped aperture 192 in the outer housing. Because outer housing 140 is fixedly coupled to upper frame 146, member 164 will change position within the aperture as the frames pivot at joint 166. Accordingly, the position of member 164 may be utilized to indicate the toe angle of the frame(s). Indicia 194 may be provided on housing 140 adjacent to shaped aperture 192, as best seen in FIG. 12.

Shaped aperture 192 may include a scalloped edge 196, such that member 164 laterally abuts the scalloped edge. This arrangement results in a detent feature, as pivoting of the frames will cause member 164 to bump from dip to dip in the scalloped edge, thereby creating a plurality of discrete positions corresponding to different orientations (i.e., toe angles) that the user can choose from. In this example, three such dips are present, resulting in three discrete orientations or angles and three different indications in the detent interface, as shown in FIGS. 12-14. Once a toe angle is selected, the user can secure the frames to each other using frame securement mechanism 186. For example, an access hole 196 in outer housing 140 may allow access to a head of bolt 162 to secure the selected angle (or release the frames for further adjustment).

Rotation of the frames may be limited (e.g., to a range of angles) by a mechanical stop 200. Mechanical stop 200 may include any suitable structures configured to arrest rotation of the upper and/or lower frames relative to each other. Mechanical stop 200 may include a member projecting from one of the frame portions through an elongated hole, such that rotation is arrested when the projecting member reaches an end of the elongated hole. In some examples, mechanical stop 200 may include adjustment bolt 162 protruding from upper frame 146 through elongated hole 188, such that pivoting of the frames is arrested when bolt 162 reaches either end of the hole. In some examples, mechanical stop 200 may include detent member 164 protruding from lower frame 148 through shaped aperture 192 in outer housing 140, such that pivoting of the frames is arrested when member 164 reaches either end of the aperture. Other suitable mechanical stops may be provided.

Illustrative Crossbar-Coupler Combinations

Figure 15:
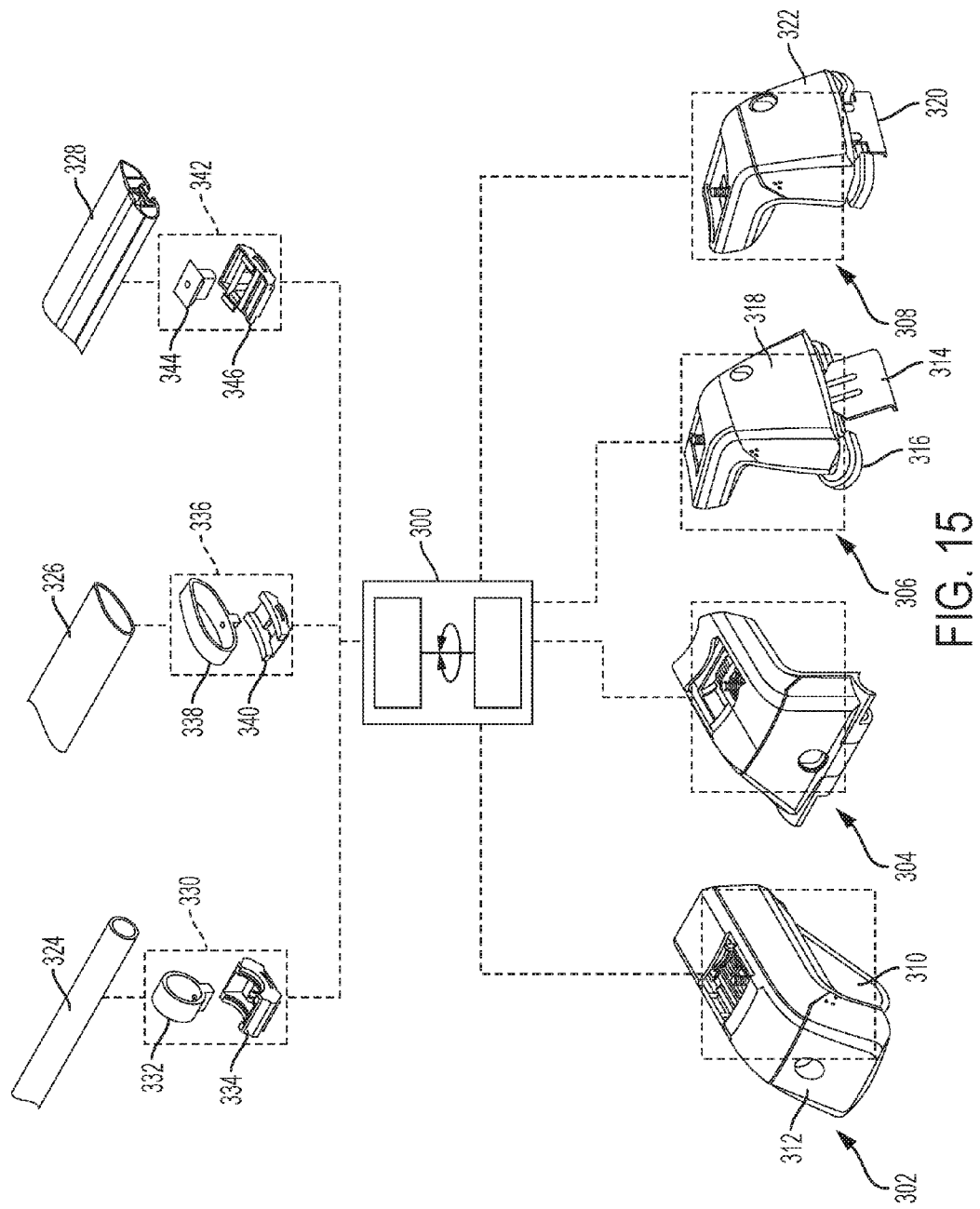
FIG. 15 is a schematic view showing various possible combinations of illustrative crossbars, clamps, and couplers having a toe adjustment mechanism according to the present teachings.

As shown in FIG. 15, this section describes various suitable combinations of an illustrative toe adjustment mechanism with different crossbars, crossbar clamps, and coupler styles. The toe adjustment mechanism described in this section is a schematic example of adjustable toe angle mechanism 24 and toe angle adjustment mechanism 158, described above.

A toe adjustment mechanism 300 is shown schematically in FIG. 15, and represents any example of toe adjustment mechanism 24 according to the present teachings (e.g., toe adjustment mechanism 158). In this type of toe adjustment mechanism, a first frame portion is pivotably coupled to a second frame portion, and a detent interface between an outer housing of the coupler and the toe adjustment mechanism, is configured to selectively permit rotation of the first frame portion relative to the second frame portion among a plurality of discrete toe angles.

Toe adjustment mechanism 300 is versatile, in that toe adjustment mechanism 300 may be utilized or incorporated into various couplers, such as couplers 302, 304, 306, 308 shown in FIG. 15. Although four such couplers are shown in FIG. 15 and described below, it should be understood that inclusion of toe adjustment mechanism 300 is optional for any given coupler, and that more or fewer couplers may be available for such inclusion.

As described above with respect to couplers 16, 100, and 130, a coupler according to the present teachings includes any suitable device configured to mount a crossbar to a vehicle feature. Accordingly, couplers 302, 304, 306, 308 each include a crossbar interface 20 comprising a selected crossbar clamp and actuator, as well as a vehicle interface 18 for clamping or otherwise connecting the coupler to a vehicle feature.

Specifically, coupler 302 is a strap-type coupler suitable for connecting the coupler to a raised rail feature of a vehicle. Raised rails generally include a pair of rails or bars each running parallel to the direction of vehicle travel and spaced above a respective lateral side of the rooftop. A strap 310 extends from a body 312 of this coupler, and is configured to pass under one of the raised rails while body 312 rests on top of the rail.

Coupler 304 is a fixed-point style of coupler, suitable for connecting to a base portion fixed to a vehicle rooftop. Retractable pins in vehicle interface portion 18 of coupler 304 extend into corresponding receptacles in the base (not pictured). An example of a coupler having this type of vehicle interface is described in U.S. Pat. No. 6,905,053, the entirety of which is hereby incorporated herein for all purposes.

Coupler 306 is a naked-roof style of coupler, similar to the couplers shown in FIG. 2, suitable for connecting the coupler to a gutter or other slot running along a side of the vehicle rooftop. An adjustable clip 314 and a base 316 for seating on the roof extend from a lower portion of a body 318 of coupler 306. Base 316 sits atop the vehicle roof, while clip 314 grabs onto the vehicle gutter (or the like).

Coupler 308 is a two-clip flush rail type of coupler. This style of coupler is suitable for connecting the coupler to a flush rail feature of a vehicle. Flush rails generally include a pair of rails or bars each running parallel to the direction of vehicle travel on respective lateral sides of the rooftop. In contrast with the raised rail, a flush rail abuts the vehicle roof such that no gap exists between the rail and the roof. A pair of clips 320 extend from a body 322 of coupler 308 to grasp the rail.

Various crossbars may be clamped to the various couplers, as indicated in FIG. 15. Suitable crossbars may include a round crossbar 324, an aerodynamic crossbar 326, and/or a slotted crossbar 328. As described above, each type of crossbar may be secured to the coupler by a respective crossbar clamp. Crossbar clamps according to the present teachings may include a bar connector and a bar seat. The bar seat sits on the upper support surface of the coupler, and the bar connector is attached to an actuator in the coupler. The bar connector engages the crossbar and the actuator pulls the connector and crossbar down onto the seat, securing the crossbar to the coupler. Specifically, a round crossbar clamp 330 may include a crossbar connector 332 comprising a round sleeve, and a crossbar seat 334 having a rounded seating surface. Similarly, an aero bar clamp 336 may include a crossbar connector 338 comprising an elongated sleeve, and a crossbar seat 340 having a seating surface that conforms to the lower surface of crossbar 326. Finally, a T-slot crossbar clamp 342 may include a T-shaped crossbar connector 344 for sliding into a bottom T-slot of crossbar 328, and a crossbar seat 346 for cradling the crossbar.

Further details regarding suitable crossbars, crossbar clamps, and related systems are disclosed in U.S. patent application Ser. No. 15/167,774, the entirety of which is hereby incorporated herein for all purposes.

Illustrative Method for Adjusting Toe Angle in a Coupler

Figure 16:
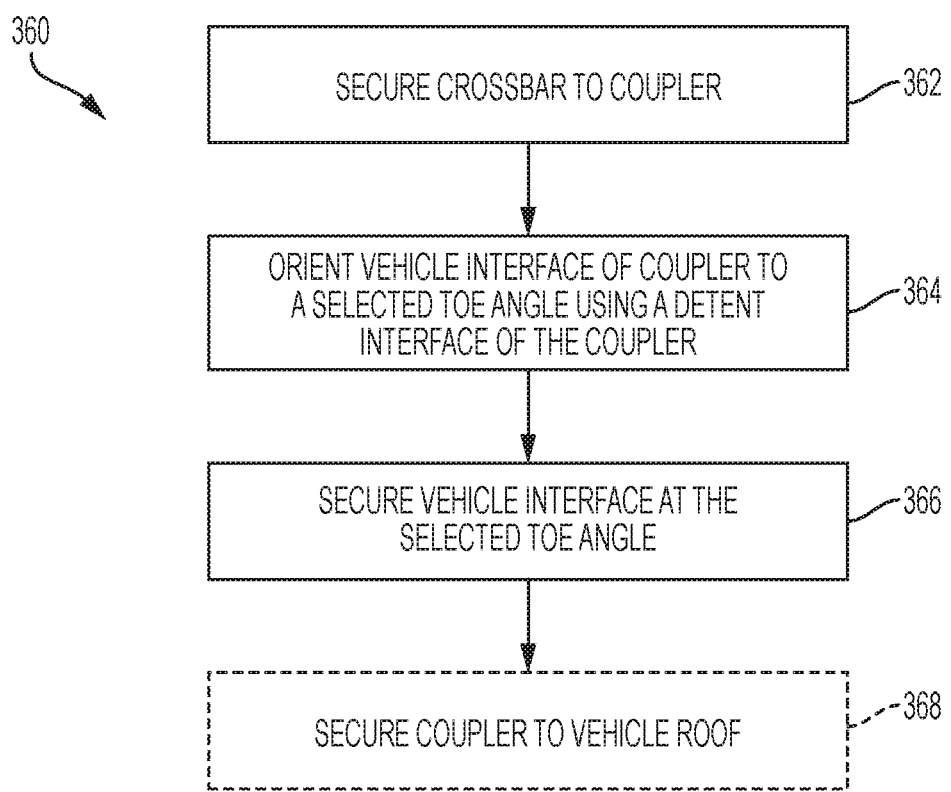
FIG. 16 is a flow chart showing steps of an illustrative method for attaching a crossbar to a vehicle.

This section describes steps of an illustrative method for attaching a crossbar to a vehicle; see FIG. 16. Aspects of adjustable toe angle couplers described above may be utilized in the method steps described below. Where appropriate, reference may be made to previously described components and systems that may be used in carrying out each step. These references are for illustration, and are not intended to limit the possible ways of carrying out any particular step of the method.

FIG. 16 is a flowchart illustrating steps performed in an illustrative method, and may not recite the complete process or all steps of the method. FIG. 16 depicts multiple steps of a method, generally indicated at 360, which may be performed in conjunction with selectable-toe couplers according to aspects of the present disclosure. Although various steps of method 360 are described below and depicted in FIG. 16, the steps need not necessarily all be performed, and in some cases may be performed in a different order than the order shown.

Step 362 includes securing a crossbar to a crossbar-to-vehicle coupler using a crossbar interface clamp of the coupler. The coupler comprising a body including an outer housing and a toe angle adjustment mechanism having a first frame portion pivotably coupled to a second frame portion. The crossbar interface clamp is fixedly coupled to the first frame portion and a vehicle interface is coupled to the second frame portion. In some examples, the outer housing of the coupler body may be fixedly coupled to only the first frame portion, i.e., not to the second frame portion, such that the housing rotates with the first frame portion. In some of these examples, the outer housing forms a skirt around the second frame portion, such that the outer housing rotates around the second frame portion.

Step 364 includes orienting the vehicle interface of the coupler to a selected toe angle relative to the crossbar by pivoting the second frame portion around a pivot axis normal to a long axis of the crossbar using a detent interface of the coupler. The detent interface comprises the outer housing and the toe angle adjustment mechanism, and is configured to selectively permit rotation of the first frame portion relative to the second frame portion among a plurality of discrete toe angles including the selected toe angle.

Orienting the vehicle interface of the coupler may include selecting an orientation of the vehicle interface such that a long axis of the crossbar is substantially perpendicular to a longitudinal axis of the vehicle.

Step 366 includes securing the vehicle interface of the coupler at the selected toe angle relative to the crossbar, by fixing the first frame portion relative to the second frame portion. Securing the vehicle interface at the selected toe angle may include securing (e.g., affixing, fastening, clamping, bolting) the first frame portion to the second frame portion.

Optional step 368 includes securing the coupler to a vehicle roof using the vehicle interface. This step may be performed at any suitable point in the process. In some examples, step 368 may be performed before step 364 and/or step 366.

Additional Examples

This section describes additional aspects and features of crossbar-to-vehicle couplers having adjustable toe angle features, and related methods, presented without limitation as a series of paragraphs, some or all of which may be alphanumerically designated for clarity and efficiency. Each of these paragraphs can be combined with one or more other paragraphs, and/or with disclosure from elsewhere in this application, including the materials incorporated by reference in the Cross-References, in any suitable manner. Some of the paragraphs below expressly refer to and further limit other paragraphs, providing without limitation examples of some of the suitable combinations.

A0. A rack for carrying cargo on top of a vehicle, the rack comprising:

a crossbar; and a coupler configured to mount an end portion of the crossbar on top of a vehicle, the coupler including a body having a first frame portion fixedly coupled to the crossbar, a second frame portion connected to the first frame portion, and a substantially continuous outer housing at least partially surrounding the first and the second frame portions, the outer housing fixed to only the first frame portion or to only the second frame portion, and a vehicle interface coupled to the second frame portion of the body, the vehicle interface configured to attach the coupler to the top of the vehicle;

wherein the second frame portion is pivotable around a substantially vertical axis relative to the first frame portion to orient the vehicle interface at a plurality of different toe angles relative to the crossbar.

A1. The rack of A0, wherein pivoting of the second frame portion relative to the first frame portion is limited by a mechanical stop.

A2. The rack of A1, wherein the mechanical stop comprises a member projecting from the first frame portion through an elongated hole in the second frame portion, such that rotation is arrested when the projecting member reaches an end of the elongated hole.

A3. The rack of any of paragraphs A0 through A2, wherein the body of the coupler further comprises a frame securement mechanism configured to selectively prevent relative rotation between the first and second frame portions.

A4. The rack of A3, wherein the frame securement mechanism comprises a bolt having a released configuration, in which the first and second frame portions are free to rotate, and a tightened configuration, in which the first and second frame portions are fixed together.

A5. The rack of A3, the body of the coupler further comprising a mechanical stop limiting rotation of the first frame relative to the second frame.

A6. The rack of any of paragraphs A0 through A5, wherein the outer housing is fixed to only the first frame portion and laterally surrounds both the first frame portion and the second frame portion, such that the outer housing forms a skirt around the second frame portion and the vehicle interface protrudes from an opening of the skirt.

A7. The rack of any of paragraphs A0 through A6, wherein the outer housing comprises a selectively removable cover portion.

A8. The rack of any of paragraphs A0 through A7, wherein the vehicle interface includes an adjustable clip configured to hook onto an edge of the vehicle roof and a resilient base portion configured to abut the vehicle roof.

B0. A crossbar-to-vehicle coupler for mounting a cargo rack to a vehicle, the coupler comprising:

a body including an outer housing and a toe angle adjustment mechanism having a first frame portion pivotably coupled to a second frame portion;

a crossbar interface clamp coupled to the first frame portion, the crossbar interface clamp configured to releasably secure the coupler to a crossbar;

a vehicle interface coupled to the first frame portion, the vehicle interface configured to releasably secure the coupler to a vehicle feature; and a detent interface between the outer housing and the toe angle adjustment mechanism, the detent interface configured to selectively permit rotation of the first frame portion relative to the second frame portion among a plurality of discrete toe angles.

B1. The coupler of B0, wherein the first frame portion is pivotable with respect to the second frame portion around a substantially vertical axis.

B2. The coupler of B1, wherein the first frame portion and the second frame portion share a pivot joint.

B3. The coupler of any of paragraphs B0 through B2, wherein the detent interface comprises a member protruding from the toe angle adjustment mechanism through a shaped aperture in the outer housing.

B4. The coupler of B3, wherein the member laterally abuts against a scalloped edge of the shaped aperture.

B5. The coupler of B3, wherein the member protrudes from the second frame portion.

B6. The coupler of B3, further comprising indicia adjacent the shaped aperture, the indicia corresponding to the plurality of discrete toe angles.

B6. The coupler of any of paragraphs B0 through B5, wherein the outer housing laterally surrounds the first frame portion and the second frame portion, the outer housing being fixedly coupled to only the first frame portion.

B7. The coupler of B6, wherein the outer housing forms a skirt around the second frame portion.

B8. The coupler of B7, wherein the outer housing comprises a removable cover portion.

B9. The coupler of any of paragraphs B0 through B8, wherein the vehicle interface includes an adjustable clip configured to hook onto an edge of the vehicle feature and a resilient base portion configured to abut the vehicle.

C0. A method for attaching a crossbar to a vehicle, the method comprising: securing a crossbar to a crossbar-to-vehicle interface coupler using a crossbar interface clamp of the coupler, the coupler comprising a body including an outer housing and a toe angle adjustment mechanism having a first frame portion pivotably coupled to a second frame portion, wherein the crossbar interface clamp is fixedly coupled to the first frame portion and a vehicle interface is coupled to the second frame portion;

orienting the vehicle interface of the coupler to a selected toe angle relative to the crossbar by pivoting the second frame portion around a pivot axis normal to a long axis of the crossbar using a detent interface of the coupler, the detent interface comprising the outer housing and the toe angle adjustment mechanism and configured to selectively permit rotation of the first frame portion relative to the second frame portion among a plurality of discrete toe angles including the selected toe angle; and securing the vehicle interface of the coupler at the selected toe angle relative to the crossbar by fixing the first frame portion relative to the second frame portion.

C1. The method of C0, further including securing the coupler to a vehicle roof using the vehicle interface.

C2. The method of C0, wherein orienting the vehicle interface of the coupler includes selecting an orientation of the vehicle interface such that a long axis of the crossbar is substantially perpendicular to a longitudinal axis of the vehicle.

C3. The method of C2, further including securing the coupler to a vehicle roof using the vehicle interface, after orienting the vehicle interface.

C4. The method of any of paragraphs C0 through C3, wherein securing the vehicle interface at the selected toe angle includes securing the first frame portion to the second frame portion.

C5. The method of any of paragraphs C0 through C4, wherein the outer housing of the coupler body is fixedly coupled to only the first frame portion.

C6. The method of C5, wherein the outer housing forms a skirt around the second frame portion.

Advantages, Features, Benefits

The different embodiments and examples of the adjustable-toe couplers described herein provide several advantages over known solutions for attaching crossbars to vehicle rooftops. For example, illustrative embodiments and examples described herein allow a toe angle to be selected from a plurality of discrete toe angles, e.g., using a detent mechanism.

Additionally, and among other benefits, illustrative embodiments and examples described herein facilitate visual indication and/or securing of the selected toe angle from an accessible portion of the coupler.

Additionally, and among other benefits, illustrative embodiments and examples described herein include an outer housing that rotates with only one of the two frames while protecting both of the frames and other internal components of the coupler.

Additionally, and among other benefits, illustrative embodiments and examples described herein facilitate a useful and easily-incorporated mechanism for providing toe adjustment in various styles and types of couplers.

No known system or device can perform these functions. However, not all embodiments and examples described herein provide the same advantages or the same degree of advantage.

Conclusion

The disclosure set forth above may encompass multiple distinct examples with independent utility. Although each of these has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only. The subject matter of the invention(s) includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. A rack for carrying cargo on top of a vehicle, the rack comprising:
    a crossbar; and
    a coupler configured to mount an end portion of the crossbar on top of a vehicle, the coupler including
        a body having a first frame portion fixedly coupled to the crossbar, a second frame portion connected to the first frame portion, and a substantially continuous outer housing at least partially surrounding the first and the second frame portions, the outer housing fixed to only the first frame portion or to only the second frame portion, and
        a vehicle interface coupled to the second frame portion of the body, the vehicle interface configured to attach the coupler to the top of the vehicle;
    wherein the second frame portion is pivotable around a substantially vertical axis relative to the first frame portion to orient the vehicle interface at a plurality of different toe angles relative to the crossbar, wherein pivoting of the second frame portion relative to the first frame portion is limited by a mechanical stop, and wherein the mechanical stop comprises a member projecting from the first frame portion through an elongated hole in the second frame portion, such that rotation is arrested when the projecting member reaches an end of the elongated hole.

2. The rack of claim 1, wherein the outer housing is fixed to only the first frame portion and laterally surrounds both the first frame portion and the second frame portion, such that the outer housing forms a skirt around the second frame portion and the vehicle interface protrudes from an opening of the skirt.

3. The rack of claim 1, wherein the outer housing comprises a selectively removable cover portion.

4. The rack of claim 1, wherein the vehicle interface includes an adjustable clip configured to hook onto an edge of the vehicle roof and a resilient base portion configured to abut the vehicle roof.

5. A crossbar-to-vehicle coupler for mounting a cargo rack to a vehicle, the coupler comprising:
    a body including an outer housing and a toe angle adjustment mechanism having a first frame portion pivotably coupled to a second frame portion;
    a crossbar interface clamp coupled to the first frame portion, the crossbar interface clamp configured to releasably secure the coupler to a crossbar;
    a vehicle interface coupled to the first frame portion, the vehicle interface configured to releasably secure the coupler to a vehicle feature; and
    a detent interface between the outer housing and the toe angle adjustment mechanism, the detent interface configured to selectively permit rotation of the first frame portion relative to the second frame portion among a plurality of discrete toe angles.

6. The coupler of claim 5, wherein the first frame portion is pivotable with respect to the second frame portion around a substantially vertical axis.

7. The coupler of claim 5, wherein the detent interface comprises a member protruding from the toe angle adjustment mechanism through a shaped aperture in the outer housing.

8. The coupler of claim 7, wherein the member laterally abuts against a scalloped edge of the shaped aperture.

9. The coupler of claim 7, wherein the member protrudes from the second frame portion.

10. The coupler of claim 7, further comprising indicia adjacent the shaped aperture, the indicia corresponding to the plurality of discrete toe angles.

11. The coupler of claim 5, wherein the outer housing laterally surrounds the first frame portion and the second frame portion, the outer housing being fixedly coupled to only the first frame portion.

12. The coupler of claim 11, wherein the outer housing forms a skirt around the second frame portion.

* * * * *